US012678837B2

(12) United States Patent
Grode et al.

(10) Patent No.: US 12,678,837 B2
(45) Date of Patent: Jul. 14, 2026

(54) DRAIN CLEANING DEVICE

(71) Applicant: MILWAUKEE ELECTRIC TOOL CORPORATION, Brookfield, WI (US)

(72) Inventors: Aaron C. Grode, Brookfield, WI (US); Justin Miller, Richfield, WI (US); Ka Seng Lim, Milwaukee, WI (US); Bradley A. Seymour, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 491 days.

(21) Appl. No.: 18/073,797

(22) Filed: Dec. 2, 2022

(65) Prior Publication Data

US 2023/0173561 A1 Jun. 8, 2023

Related U.S. Application Data

(60) Provisional application No. 63/285,189, filed on Dec. 2, 2021.

(51) Int. Cl.
*B08B 9/045* (2006.01)
*B65H 75/40* (2006.01)
(Continued)

(52) U.S. Cl.
CPC .......... *B08B 9/045* (2013.01); *B65H 75/403* (2013.01); *B65H 75/4486* (2013.01);
(Continued)

(58) Field of Classification Search
CPC .......... E03C 1/302; B08B 9/045; E03F 9/005; B65H 35/0033; B65H 3/063;
(Continued)

(56) References Cited

U.S. PATENT DOCUMENTS

| | | | |
|---|---|---|---|
| 1,600,373 | A | 9/1926 | Streml |
| 1,722,512 | A | 7/1929 | Wilt |

(Continued)

FOREIGN PATENT DOCUMENTS

| | | | |
|---|---|---|---|
| CN | 87213619 | U | 10/1988 |
| CN | 2058411 | U | 6/1990 |

(Continued)

OTHER PUBLICATIONS

International Search Report and Written Opinion for Application No. PCT/US2022/051674 dated Apr. 19, 2023 (11 pages).

(Continued)

*Primary Examiner* — Laura C Guidotti
(74) *Attorney, Agent, or Firm* — Michael Best & Friedrich LLP

(57) ABSTRACT

A drain cleaning device includes a frame and a drum assembly supported by the frame. The drum assembly includes an inner drum, an outer drum, and a space defined therebetween. The drum assembly is configured to rotate about an axis of rotation. The drain cleaning device also includes a motor supported by the drum assembly. The motor includes an output shaft. The drain cleaning device further includes a flexible cable stored within the space. The flexible cable defines a first end and a second end opposite the first end. The first end is coupled to the output shaft to receive torque from the motor. The drum cleaning device also includes a battery receptacle supported by the drum assembly. The battery receptacle is configured to receive a battery pack that supplies power to the motor.

30 Claims, 21 Drawing Sheets

(51) Int. Cl.
*B65H 75/44* (2006.01)
*E03C 1/302* (2006.01)
*E03F 9/00* (2006.01)
*B65H 75/36* (2006.01)

(52) U.S. Cl.
CPC .............. *E03C 1/302* (2013.01); *E03F 9/005* (2013.01); *B65H 75/364* (2013.01); *B65H 75/4468* (2013.01)

(58) Field of Classification Search
CPC .............. B65H 2553/41; B65H 75/403; B65H 75/4486; B65H 75/4468
USPC ........................................................ 15/104.33
See application file for complete search history.

(56) References Cited

U.S. PATENT DOCUMENTS 1,758,504 A 5/1930 English
1,863,460 A 6/1932 Auringer
1,871,798 A 8/1932 King
1,898,503 A 2/1933 Silberger
1,910,768 A 5/1933 Hotchkiss, Jr.
1,912,525 A 6/1933 Hotchkiss, Jr.
1,990,686 A 2/1935 Einhorn et al.
2,069,871 A 2/1937 Blanc
2,090,174 A 8/1937 Albright
2,111,527 A 3/1938 Blanc
2,139,702 A 12/1938 Tanner
2,158,577 A 5/1939 Haley
2,167,268 A 7/1939 Sanger
2,169,543 A 8/1939 Sullivan
2,244,735 A 6/1941 Silverman
2,266,659 A 12/1941 Robinson et al.
2,450,486 A 10/1948 Perry
2,460,149 A 1/1949 Schoensiegel
2,466,493 A 4/1949 Sketchley
2,467,849 A 4/1949 O'Brien et al.
2,468,490 A 4/1949 Di Joseph
2,501,311 A 3/1950 Burton
2,552,808 A 5/1951 O'Brien
2,608,421 A 8/1952 Schnepp
2,610,807 A 9/1952 O'Brien
2,630,590 A 3/1953 O'Brien
2,661,489 A 12/1953 Rudolph et al.
2,679,061 A 5/1954 Baker
2,693,611 A 11/1954 Lombardi
2,849,870 A 9/1958 Silverman
2,880,435 A 4/1959 Deutsch et al.
3,025,547 A 3/1962 Ciaccio
3,075,217 A 1/1963 Kollmann
3,118,159 A 1/1964 Kollmann
3,268,937 A 8/1966 Bollinger
3,397,420 A 8/1968 Michael
3,449,003 A 6/1969 Hunt
3,451,089 A 6/1969 Carlson et al.
3,451,090 A 6/1969 Lo Presti et al.
3,457,580 A 7/1969 Meyers
3,691,583 A 9/1972 Silverman et al.
3,694,011 A 9/1972 Silverman
3,747,153 A 7/1973 O'Neill
3,757,375 A 9/1973 Strom
4,071,919 A 2/1978 Fields et al.
4,218,802 A 8/1980 Babb et al.
4,284,931 A 8/1981 Ehret
4,364,139 A 12/1982 Babb et al.
4,403,885 A 9/1983 Babb
4,420,852 A 12/1983 Bowlsby
4,546,519 A 10/1985 Pembroke
4,666,530 A 5/1987 Houser
4,692,957 A 9/1987 Kovacs
4,774,739 A 10/1988 Sherman, Jr.
4,792,363 A 12/1988 Franklin, Jr. et al.
4,887,929 A 12/1989 Hale
4,914,775 A 4/1990 Kirk
4,956,889 A 9/1990 Kirk
4,984,329 A 1/1991 Wade
5,031,263 A 7/1991 Babb et al.
5,031,276 A 7/1991 Babb et al.
5,056,176 A 10/1991 Belcher
5,107,568 A 4/1992 Wade
5,199,129 A 4/1993 Salecker et al.
5,222,270 A 6/1993 Sloter et al.
5,235,718 A 8/1993 Grimsley et al.
5,239,724 A 8/1993 Salecker et al.
5,243,128 A * 9/1993 Marcoz .................. G01B 7/003
324/207.16
5,309,595 A 5/1994 Salecker et al.
5,390,389 A 2/1995 Rutkowski et al.
5,507,062 A 4/1996 Salecker
5,657,505 A 8/1997 Gallagher et al.
5,740,830 A 4/1998 Mankins
5,819,354 A 10/1998 Alonso et al.
5,901,401 A 5/1999 Rutkowski et al.
5,933,903 A 8/1999 Irwin
6,009,588 A 1/2000 Rutkowski
6,032,325 A 3/2000 Smith
6,158,076 A 12/2000 Rutkowski et al.
6,161,563 A 12/2000 Mankins
6,187,105 B1 2/2001 Matlschweiger
6,243,905 B1 6/2001 Rutkowski
6,360,397 B1 3/2002 Babb
6,381,798 B1 5/2002 Rutkowski et al.
6,390,118 B1 5/2002 Mankins
6,412,136 B1 7/2002 Rutkowski
6,564,823 B1 5/2003 Mankins
6,615,436 B1 9/2003 Burch, Jr. et al.
6,626,195 B1 9/2003 Garman et al.
6,637,064 B2 10/2003 Silverman et al.
6,655,228 B1 12/2003 Margherio et al.
6,820,653 B1 11/2004 Schempf et al.
7,040,331 B2 5/2006 Garman et al.
7,178,534 B2 2/2007 Garman et al.
7,269,874 B2 * 9/2007 Hung ...................... B08B 9/045
15/104.095
7,367,077 B2 * 5/2008 Rutkowski .............. B08B 9/045
15/104.31
7,478,451 B2 1/2009 Rutkowski et al.
7,530,363 B2 5/2009 Garman
7,584,513 B2 9/2009 Turner
7,685,669 B2 3/2010 Rutkowski et al.
7,716,782 B2 5/2010 Terrien et al.
7,810,176 B2 10/2010 Turner
7,827,647 B2 11/2010 Good
7,889,980 B2 2/2011 Sooy
8,046,862 B2 11/2011 Eisermann et al.
8,060,968 B2 11/2011 Babb et al.
8,176,593 B2 5/2012 Gress et al.
8,192,559 B2 6/2012 Garman
8,395,661 B1 3/2013 Olsson et al.
8,413,347 B2 4/2013 Gress et al.
8,448,370 B2 5/2013 Williams
8,580,041 B2 11/2013 Schafer et al.
8,584,296 B2 11/2013 Doty
8,615,837 B2 12/2013 Hale et al.
8,646,143 B2 * 2/2014 Lokkinen ................ E03F 9/005
242/390.8
8,826,483 B2 9/2014 Rutkowski et al.
8,908,027 B2 12/2014 Kleyn et al.
8,984,698 B1 3/2015 Olsson
9,009,906 B2 4/2015 Hale et al.
9,011,255 B1 4/2015 Franzino et al.
9,062,921 B2 6/2015 Gromes, Sr.
9,126,241 B2 9/2015 Majeed
9,134,255 B1 9/2015 Olsson et al.
9,222,809 B1 12/2015 Olsson et al.
9,321,088 B2 4/2016 Doty
9,346,085 B2 5/2016 Khani Moghanaki
9,477,147 B2 * 10/2016 Chapman .................. F16F 3/04
9,521,303 B2 12/2016 Olsson et al.
9,824,433 B2 11/2017 Olsson et al.
9,829,783 B1 11/2017 Chapman et al.
9,884,353 B2 2/2018 Banholzer et al.
9,924,139 B2 3/2018 Olsson et al.

(56) References Cited

U.S. PATENT DOCUMENTS

| | | | | |
|---|---|---|---|---|
| 9,951,821 | B1 | 4/2018 | Franzino | |
| 9,975,154 | B1 | 5/2018 | Banholzer et al. | |
| 10,005,168 | B2 | 6/2018 | Lokkinen | |
| 10,009,582 | B2 | 6/2018 | Olsson et al. | |
| 10,024,366 | B2 | 7/2018 | Kleyn et al. | |
| 10,084,945 | B1 | 9/2018 | Olsson et al. | |
| 10,100,507 | B1 | 10/2018 | Olsson | |
| 10,184,605 | B2 | 1/2019 | Reid et al. | |
| 10,233,629 | B2 | 3/2019 | Cole et al. | |
| 10,239,100 | B2 | 3/2019 | Banholzer et al. | |
| 10,379,436 | B1 | 8/2019 | Olsson et al. | |
| 10,384,241 | B2 | 8/2019 | Lokkinen | |
| 10,434,547 | B2 | 10/2019 | Turner et al. | |
| 10,480,171 | B2 | 11/2019 | Miller et al. | |
| 10,486,207 | B2 | 11/2019 | Kehoe et al. | |
| 10,508,431 | B2 | 12/2019 | Cole et al. | |
| 10,612,229 | B2 | 4/2020 | Miller et al. | |
| 10,626,593 | B2 | 4/2020 | Puzio et al. | |
| 10,646,904 | B2 | 5/2020 | Lokkinen | |
| 10,646,905 | B2 | 5/2020 | Cole et al. | |
| 10,704,250 | B2 | 7/2020 | Scott et al. | |
| 10,722,928 | B2 | 7/2020 | Kehoe et al. | |
| 10,736,412 | B2 | 8/2020 | Hiltunen | |
| 10,829,920 | B2 | 11/2020 | Yu | |
| 10,834,364 | B2 | 11/2020 | Olsson et al. | |
| 10,837,259 | B2 | 11/2020 | Reyes et al. | |
| 10,851,868 | B2 | 12/2020 | Cole et al. | |
| 10,863,064 | B1 | 12/2020 | Olsson et al. | |
| 10,907,690 | B1 | 2/2021 | Kleyn et al. | |
| 10,987,708 | B2 * | 4/2021 | Szucs | B08B 9/045 |
| 11,110,495 | B2 | 9/2021 | Turner et al. | |
| 11,132,781 | B1 | 9/2021 | Olsson et al. | |
| 11,168,468 | B2 | 11/2021 | Kehoe et al. | |
| 2003/0231927 | A1 | 12/2003 | Hale | |
| 2005/0108846 | A1 | 5/2005 | Peterson | |
| 2005/0109375 | A1 | 5/2005 | Peterso | |
| 2005/0193509 | A1 | 9/2005 | Rutkowski et al. | |
| 2008/0000040 | A1 | 1/2008 | Peterson | |
| 2008/0098544 | A1 | 5/2008 | Rutkowski et al. | |
| 2008/0127437 | A1 | 6/2008 | Good | |
| 2008/0148503 | A1 | 6/2008 | Babb et al. | |
| 2008/0244816 | A1 | 10/2008 | Babb et al. | |
| 2009/0038093 | A1 * | 2/2009 | Irwin | B08B 9/045 15/104.095 |
| 2009/0083915 | A1 | 4/2009 | Cicchelli et al. | |
| 2009/0083921 | A1 | 4/2009 | Williams | |
| 2009/0300863 | A1 | 12/2009 | Bartucciotto | |
| 2010/0005603 | A1 | 1/2010 | Liu | |
| 2010/0017981 | A1 | 1/2010 | Hamm et al. | |
| 2011/0056007 | A1 | 3/2011 | Caywood et al. | |
| 2011/0154594 | A1 | 6/2011 | Kozak | |
| 2011/0182656 | A1 | 7/2011 | Babb | |
| 2012/0300057 | A1 | 11/2012 | Bartucciotto | |
| 2012/0312910 | A1 | 12/2012 | Lokkinen | |
| 2013/0000680 | A1 | 1/2013 | Azelton et al. | |
| 2014/0059787 | A1 | 3/2014 | Schafer et al. | |
| 2014/0210989 | A1 * | 7/2014 | Olsson | H04N 7/183 348/84 |
| 2015/0104241 | A1 | 4/2015 | Spelich et al. | |
| 2015/0246789 | A1 | 9/2015 | Gromes, Sr. et al. | |
| 2016/0067752 | A1 | 3/2016 | Dennis et al. | |
| 2017/0368581 | A1 | 12/2017 | Lokkinen | |
| 2018/0056342 | A1 | 3/2018 | Lokkinen | |
| 2018/0085797 | A1 | 3/2018 | Beyer | |
| 2018/0147612 | A1 | 5/2018 | Kehoe et al. | |
| 2018/0147713 | A1 | 5/2018 | Schmauder et al. | |
| 2018/0169719 | A1 * | 6/2018 | Turner | B65H 75/403 |
| 2018/0238395 | A1 | 8/2018 | Franzino | |
| 2019/0118230 | A1 | 4/2019 | Newth | |
| 2019/0141296 | A1 | 5/2019 | Olsson et al. | |
| 2019/0174692 | A1 | 6/2019 | Harman et al. | |
| 2019/0193128 | A1 | 6/2019 | Banholzer et al. | |
| 2019/0210078 | A1 | 7/2019 | Davies et al. | |
| 2019/0234451 | A1 | 8/2019 | Lokkinen | |
| 2019/0329303 | A1 | 10/2019 | Lokkinen | |
| 2020/0030858 | A1 | 1/2020 | Turner et al. | |
| 2020/0047223 | A1 | 2/2020 | Kehoe et al. | |
| 2020/0208394 | A1 | 7/2020 | Puzio et al. | |
| 2020/0217060 | A1 | 7/2020 | Miller et al. | |
| 2020/0238345 | A1 | 7/2020 | Mavros et al. | |
| 2020/0291632 | A1 | 9/2020 | Scott et al. | |
| 2020/0353515 | A1 | 11/2020 | Kehoe et al. | |
| 2021/0041005 | A1 | 2/2021 | Cole et al. | |
| 2021/0159818 | A1 | 5/2021 | Moghe et al. | |
| 2021/0164601 | A1 | 6/2021 | Warren et al. | |
| 2021/0172162 | A1 | 6/2021 | Cole et al. | |
| 2021/0205863 | A1 | 7/2021 | Rutkowski et al. | |
| 2021/0354178 | A1 | 11/2021 | Turner et al. | |

FOREIGN PATENT DOCUMENTS

| | | | |
|---|---|---|---|
| CN | 2058412 | U | 6/1990 |
| CN | 2083517 | U | 8/1991 |
| CN | 2109897 | U | 7/1992 |
| CN | 2111801 | U | 8/1992 |
| CN | 2114517 | U | 9/1992 |
| CN | 2117217 | U | 9/1992 |
| CN | 2117954 | U | 10/1992 |
| CN | 2121278 | U | 11/1992 |
| CN | 2127326 | Y | 2/1993 |
| CN | 2130116 | Y | 4/1993 |
| CN | 2133620 | Y | 5/1993 |
| CN | 2134241 | Y | 5/1993 |
| CN | 2137568 | Y | 7/1993 |
| CN | 2145076 | Y | 11/1993 |
| CN | 2145653 | Y | 11/1993 |
| CN | 2150935 | Y | 12/1993 |
| CN | 2172167 | Y | 7/1994 |
| CN | 2176852 | Y | 9/1994 |
| CN | 2179795 | Y | 10/1994 |
| CN | 2179796 | Y | 10/1994 |
| CN | 2180348 | Y | 10/1994 |
| CN | 2180349 | Y | 10/1994 |
| CN | 2182687 | Y | 11/1994 |
| CN | 2189499 | Y | 2/1995 |
| CN | 2191242 | Y | 3/1995 |
| CN | 2206161 | Y | 8/1995 |
| CN | 2208989 | Y | 10/1995 |
| CN | 2212459 | Y | 11/1995 |
| CN | 2213180 | Y | 11/1995 |
| CN | 2220906 | Y | 2/1996 |
| CN | 2224038 | Y | 4/1996 |
| CN | 2277423 | Y | 4/1998 |
| CN | 2297486 | Y | 11/1998 |
| CN | 2309368 | Y | 3/1999 |
| CN | 2327730 | Y | 7/1999 |
| CN | 2328709 | Y | 7/1999 |
| CN | 2343219 | Y | 10/1999 |
| CN | 2416970 | Y | 1/2001 |
| CN | 2460587 | Y | 11/2001 |
| CN | 2698865 | Y | 5/2005 |
| CN | 2771327 | Y | 4/2006 |
| CN | 2876199 | Y | 3/2007 |
| CN | 201020466 | Y | 2/2008 |
| CN | 201036780 | Y | 3/2008 |
| CN | 201052511 | Y | 4/2008 |
| CN | 201188967 | Y | 2/2009 |
| CN | 201253623 | Y | 6/2009 |
| CN | 201361630 | Y | 12/2009 |
| CN | 201367632 | Y | 12/2009 |
| CN | 201482767 | U | 5/2010 |
| CN | 201482768 | U | 5/2010 |
| CN | 201644461 | U | 11/2010 |
| CN | 201695482 | U | 1/2011 |
| CN | 201702148 | U | 1/2011 |
| CN | 201915465 | U | 8/2011 |
| CN | 201950051 | U | 8/2011 |
| CN | 201962751 | U | 9/2011 |
| CN | 202108090 | U | 1/2012 |
| CN | 102655313 | A | 9/2012 |
| CN | 102677749 | A | 9/2012 |
| CN | 203008068 | U | 6/2013 |
| CN | 203129280 | U | 8/2013 |
| CN | 203200864 | U | 9/2013 |

(56) References Cited

FOREIGN PATENT DOCUMENTS

| | | | |
|---|---|---|---|
| CN | 203304217 | U | 11/2013 |
| CN | 203531084 | U | 4/2014 |
| CN | 203532496 | U | 4/2014 |
| CN | 203541032 | U | 4/2014 |
| CN | 203769018 | U | 8/2014 |
| CN | 203782833 | U | 8/2014 |
| CN | 204098166 | U | 1/2015 |
| CN | 204170993 | U | 2/2015 |
| CN | 104563237 | A | 4/2015 |
| CN | 204266324 | U | 4/2015 |
| CN | 204353155 | U | 5/2015 |
| CN | 204456339 | U | 7/2015 |
| CN | 204657046 | U | 9/2015 |
| CN | 204690872 | U | 10/2015 |
| CN | 204866755 | U | 12/2015 |
| CN | 205636956 | U | 10/2016 |
| CN | 106638837 | A | 5/2017 |
| CN | 106807697 | A | 6/2017 |
| CN | 106944385 | A | 7/2017 |
| CN | 105215021 | B | 9/2017 |
| CN | 107268773 | A | 10/2017 |
| CN | 206538830 | U | 10/2017 |
| CN | 107724523 | A | 2/2018 |
| CN | 107761866 | A | 3/2018 |
| CN | 207672687 | U | 7/2018 |
| CN | 108554947 | A | 9/2018 |
| CN | 108612161 | A | 10/2018 |
| CN | 106623291 | B | 1/2019 |
| CN | 110369411 | A | 10/2019 |
| CN | 209494037 | U | 10/2019 |
| CN | 209550159 | U | 10/2019 |
| CN | 209613719 | U | 11/2019 |
| CN | 210333628 | U | 4/2020 |
| CN | 210333629 | U | 4/2020 |
| CN | 210523299 | U | 5/2020 |
| CN | 210546835 | U | 5/2020 |
| CN | 111438144 | A | 7/2020 |
| CN | 210966210 | U | 7/2020 |
| CN | 211312729 | U | 8/2020 |
| CN | 111636528 | A | 9/2020 |
| CN | 211447136 | U | 9/2020 |
| CN | 211472747 | U | 9/2020 |
| CN | 108867785 | B | 10/2020 |
| CN | 211922867 | U | 11/2020 |
| CN | 112127448 | A | 12/2020 |
| CN | 112227477 | A | 1/2021 |
| CN | 212264064 | U | 1/2021 |
| CN | 212397523 | U | 1/2021 |
| DE | 330946 | C | 1/1921 |
| DE | 1642730 | U | 8/1952 |
| DE | 968057 | C | 1/1958 |
| DE | 1634136 | A1 | 3/1971 |
| DE | 2064410 | A1 | 7/1971 |
| DE | 2452630 | A1 | 10/1976 |
| DE | 2548829 | A1 | 5/1977 |
| DE | 2648108 | A1 | 6/1977 |
| DE | 2613944 | A1 | 10/1977 |
| DE | 2806725 | A1 | 8/1979 |
| DE | 8232917 | U1 | 3/1983 |
| DE | 3420740 | A1 | 1/1985 |
| DE | 8514383 | U1 | 6/1985 |
| DE | 8707073 | U1 | 7/1987 |
| DE | 9011476 | U1 | 10/1990 |
| DE | 29612512 | U1 | 11/1996 |
| DE | 202015004104 | U1 | 6/2015 |
| DE | 102010026774 | B4 | 9/2017 |
| DE | 202020004061 | U1 | 11/2020 |
| EP | 0063024 | A1 | 10/1982 |
| EP | 0995845 | A2 | 4/2000 |
| EP | 1375763 | A1 | 1/2004 |
| EP | 1031296 | B1 | 9/2004 |
| EP | 3290127 | A1 | 3/2018 |
| GB | 818278 | A | 8/1959 |
| WO | WO2006112847 | A1 | 10/2006 |
| WO | WO2006112848 | A1 | 10/2006 |
| WO | WO2012154102 | A1 | 11/2012 |
| WO | WO2013079799 | A1 | 6/2013 |
| WO | WO2014145778 | A1 | 9/2014 |
| WO | WO2015001194 | A1 | 1/2015 |
| WO | WO2015004321 | A1 | 1/2015 |
| WO | WO2018132091 | A1 | 7/2018 |
| WO | WO2018162714 | A1 | 9/2018 |
| WO | WO2019019461 | A1 | 1/2019 |
| WO | WO2019041560 | A1 | 3/2019 |
| WO | WO2019197167 | A1 | 10/2019 |
| WO | WO2020215059 | A1 | 10/2020 |
| WO | WO2020231966 | A1 | 11/2020 |
| WO | WO2020251970 | A1 | 12/2020 |

OTHER PUBLICATIONS

GI Industries Inc., “Warlock TCM-6000: High Torque Cutting, Grinding, Cleaning, and Re-Installing,” <https://giind.com/product-details/tcm-6000-the-warlock-pipe-cleaning/> Web page visited Mar. 29, 2023 (5 pages).

GI Industries Inc., “Quick-Setup Pipe/Bore Cleaning System,” Instructions dated May 2009 (1 page).

Milwaukee Tool, “M18 Fuel™ High Speed Chain Snake for 1/1-2"-4" Pipes,” <https://www.milwaukeetool.com/Products/2819-22> web page visited May 20, 2024 (17 pages).

Picote Solutions Oy Ltd, “Battery Mini Miller 8/16 | Battery Mini Miller +C 8/16,” Operation & Safety Manual, dated Apr. 2021 (29 pages).

Picote Solutions Oy Ltd, “Picote Battery Powered Mini Miller,” <https://pipecore.com.au/products/picote-battery-powered-mini-miller?srsltid=AfmBOooivNULGI0hs69tH7YGJFmySTzROqqj_UVOLxWxpiLvhkoMBhcU> web page visited Jan. 7, 2025 (5 pages).

Picote Solutions, “Picote Battery Operated Mini Miller,” <https://www.youtube.com/watch?v=eQj6eMsFAwo> video published to YouTube on Feb. 19, 2021 (1 page).

Picote Solutions, “Picote Battery Millers, the Next Generation in High-Speed Pipe Cleaning,” <https://www.youtube.com/watch?v=6NX9xFh57zE> video published to YouTube on Jun. 20, 2022 (1 page).

* cited by examiner

DRAIN CLEANING DEVICE

CROSS REFERENCE TO RELATED APPLICATION

This application claims the priority benefit of U.S. Provisional Patent Application No. 63/285,189, filed on Dec. 2, 2021, the entire content of which is incorporated herein by reference.

FIELD OF THE DISCLOSURE

The present application relates to drain cleaning devices for cleaning drains, pipes, or other conduits, and specifically, to a flexible shaft drain cleaner.

BACKGROUND OF THE DISCLOSURE

Flexible shaft drain cleaners are known as high speed drain cleaners because they include motors that spin the cable at higher speeds. The higher speed is produced by directly driving the cable with torque from a motor/drive mechanism. In addition, flexible shaft drain cleaners include an improved cable to withstand the higher speeds. Flexible shaft cables are different from traditional drain cleaner cables and typically include a wound cable that is encased by a sheath.

SUMMARY OF THE DISCLOSURE

In one independent aspect, the invention provides a drain cleaning device including a frame and a drum assembly supported by the frame. The drum assembly includes an inner drum, an outer drum, and a space defined therebetween. The drum assembly is configured to rotate about an axis of rotation. The drain cleaning device also includes a motor supported by the drum assembly. The motor includes an output shaft. The drain cleaning device further includes a flexible cable stored within the space. The flexible cable defines a first end and a second end opposite the first end. The first end is coupled to the output shaft to receive torque from the motor. The drum cleaning device also includes a battery receptacle supported by the drum assembly. The battery receptacle is configured to receive a battery pack that supplies power to the motor.

In another independent aspect, the invention provides a drain cleaning device including a frame and a drum assembly with an inner drum, an outer drum, and a space defined therebetween. The drum assembly is configured to rotate about an axis of rotation. The drain cleaning device also includes a motor supported by the drum assembly. The motor includes an output shaft. The drain cleaning device further includes a control panel supported by the frame. The control panel is configured to control operations of the drain cleaning device. The drain cleaning device further includes an electronics housing supported by the drum assembly, control electronics disposed within the electronics housing, a slip ring disposed between the control panel and the electronics housing to guide electrical wires from the control panel to the electronics housing, and a flexible cable stored within the space. The flexible cable receiving torque from the motor to rotate In another independent aspect, the invention provides a drain cleaning device including a frame with a plurality of links coupled together to form a cage-like structure and a drum assembly supported by the frame. The drum assembly includes an inner drum, an outer drum, and a space defined therebetween. The drum assembly is configured to rotate about an axis of rotation. The drain cleaning device also includes a motor supported by the drum assembly. The motor includes an output shaft. The drain cleaning device further includes a flexible cable stored within the space. The flexible cable defines a first end and a second end opposite the first end. The first end coupled to the output shaft to receive torque from the motor. The drum assembly includes a closed rear end and an open front end opposite the rear end.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
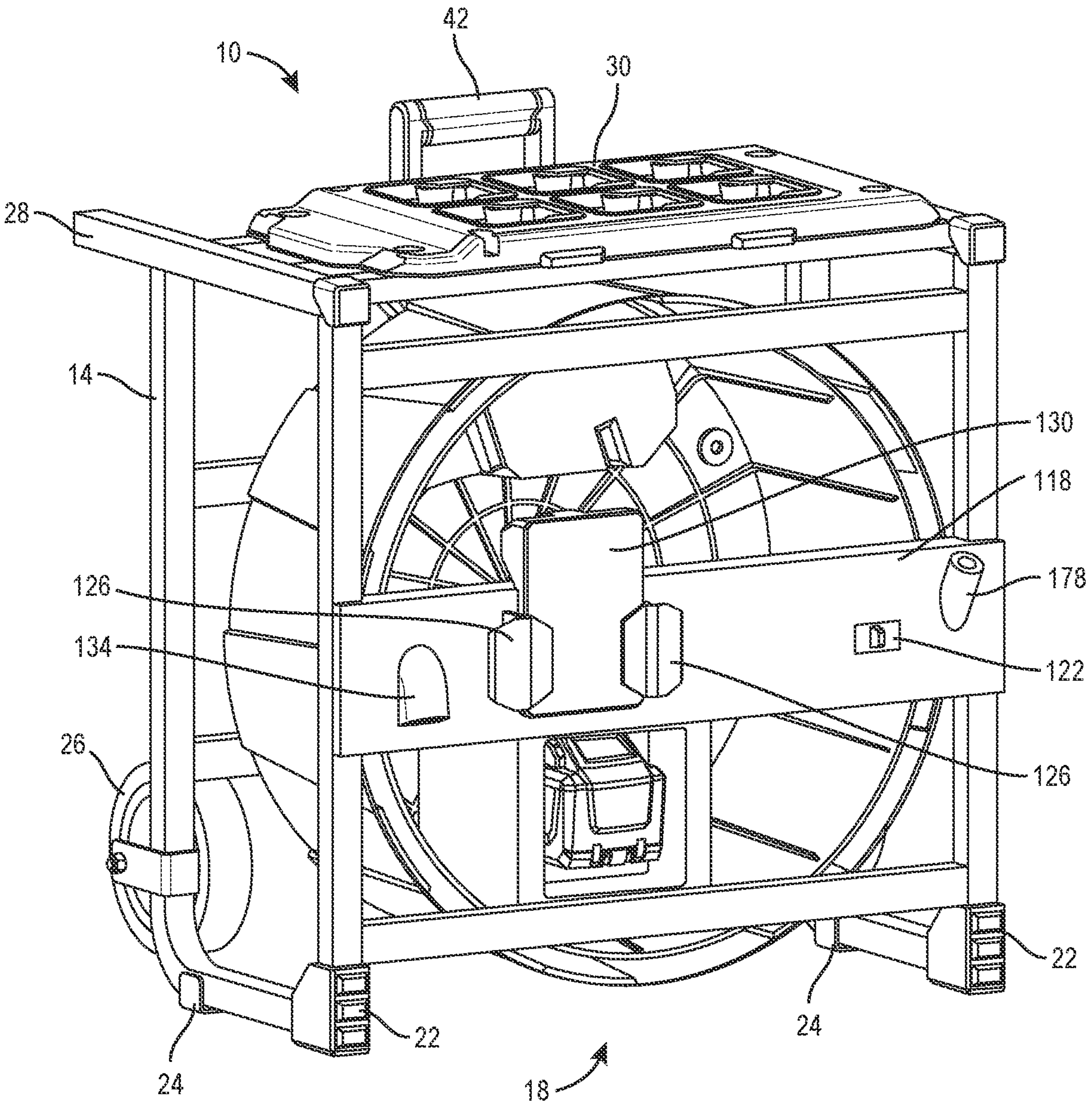
FIG. 1 is a front perspective view of a drain cleaning device.
Figure 2:
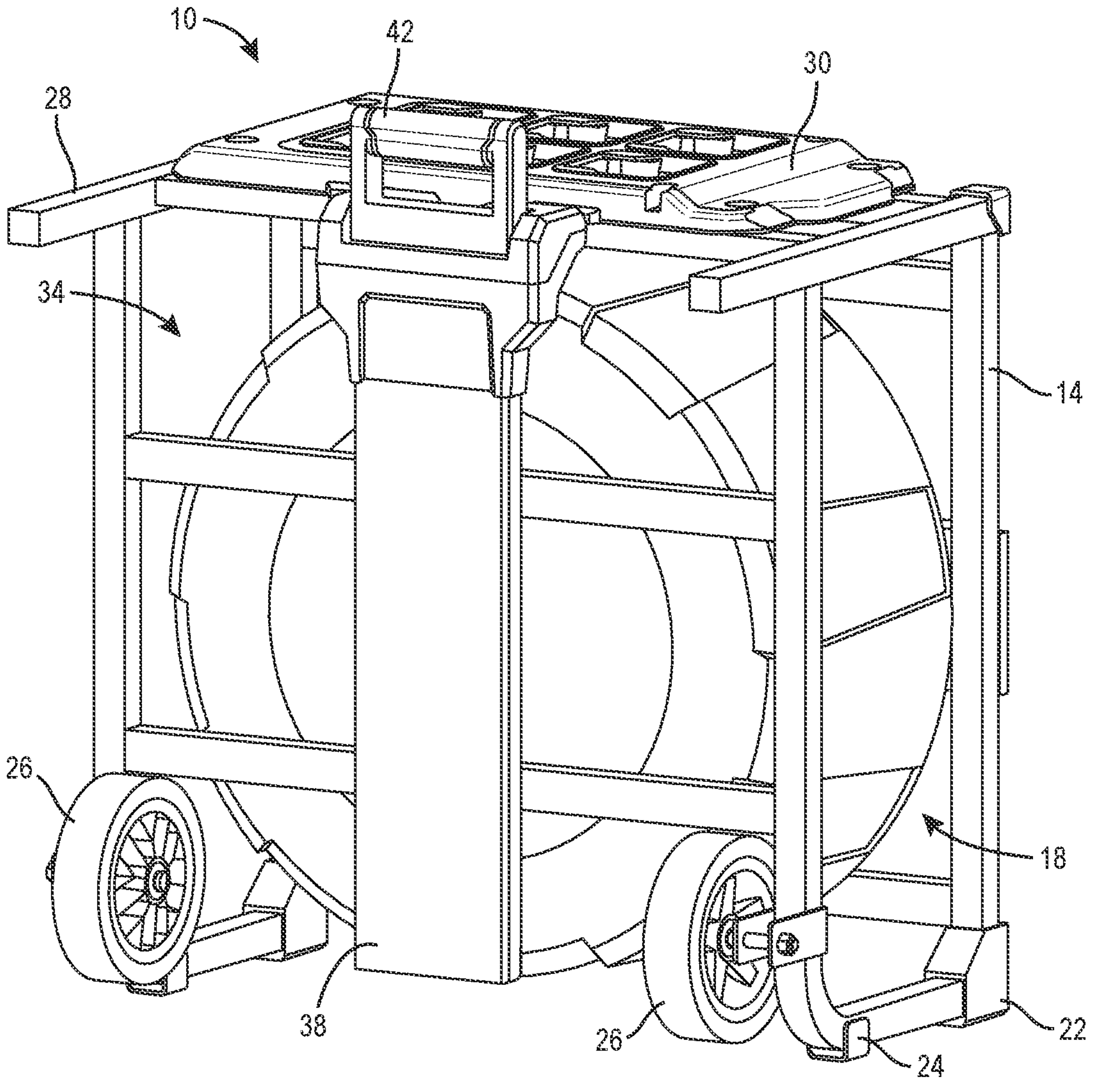
FIG. 2 is a rear perspective view of the drain cleaning device of FIG. 1.

FIGS. 1 and 2 illustrate a drain cleaning device 10 that is operable to clear and clean debris from pipes or other conduits. In the illustrated embodiment, the drain cleaning device 10 is a flexible shaft drain cleaner. The drain cleaning device 10 is operable to spin a drain cleaning cable at a relatively high speed. As described below, the drain cleaning cable may include a wound cable, or other suitable cable, positioned within a sheath. The wound cable is driven (e.g., spun) by the drain cleaning device 10 within the sheath to clear debris from a conduit.

The illustrated drain cleaning device 10 includes a frame 14 and a drum assembly 18 supported by the frame 14. The frame 14 is made from a plurality of bars or links that are coupled together through welding, fasteners, or the like. The bars of the frame 14 are coupled together to form a cage-like structure around the drum assembly 18. In some embodiments, the frame 14 is made from a metal material such as aluminum or steel. In other embodiments, the frame 14 may be made from other materials such as plastic or the like. The frame 14 includes a pair of rubber grommets 22 on a front side to help stabilize the drain cleaning device 10 when the drain cleaning device 10 is in an upright position, as shown in FIG. 1. The frame 14 also includes feet 24 to help further stabilize the drain cleaning device 10 in the upright position. Wheels 26 are coupled to a back side of the frame 14 to facilitate transporting the drain cleaning device 10 across a surface. For example, the drain cleaning device 10 may be tipped onto the wheels 26 (and off of the grommets 22 and feet 24) to move the drain cleaning device 10 along the ground. The illustrated wheels 26 are positioned adjacent, but rearward of the feet 24. In the illustrated embodiment, the wheels 26 are idle (i.e., non-driven wheels). In other embodiments, the wheels 26 may be driven wheels. The drain cleaning device 10 may also be tipped completely onto the wheels 26 and legs 28 of the frame 14 to position the drain cleaning device 10 in a horizontal, operating position. The legs 28 are located adjacent a top side of the frame 14 and extend rearward from the frame 14.

In the illustrated embodiment, a modular storage bin 30 is coupled to the top side of the frame 14. The storage bin 30 can support and store accessories or tools for use with the drain cleaning device 10. For example, the storage bin 30 can store battery packs that may be used to power the drain cleaning device 10. The storage bin 30 can also store cleaning heads that can be coupled to the cable of the drain cleaning device 10. In some embodiments, the storage bin 30 may be removable from the frame 14. In such embodiments, the storage bin 30 may include a handle to facilitate lifting the storage bin 30 off of the frame 14 and separately carrying the storage bin 30. In other embodiments, the storage bin 30 may be selectively replaced with another type of storage bin that stores tools or additional accessories for use with the drain cleaning device 10. In further embodiments, the storage bin 30 may be a modular storage accessory that receives other storage units such as tool boxes, bins, or the like.

Figure 3:
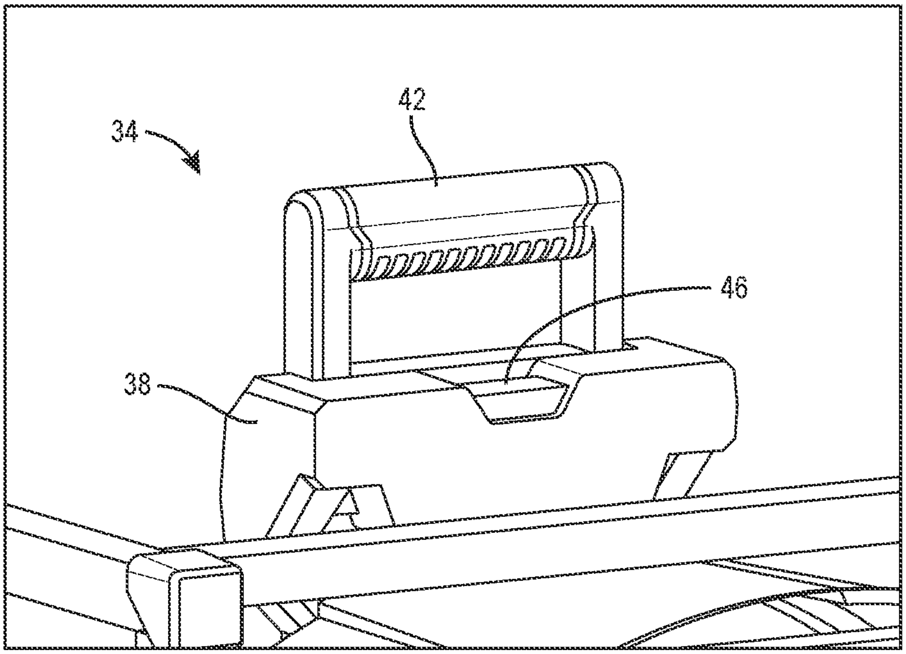
FIG. 3 is a perspective view of a handle assembly of the drain cleaning device of FIG. 1.

As shown in FIG. 2, a handle assembly 34 is coupled to the frame 14 to facilitate transporting the drain cleaning device 10. The handle assembly 34 includes a handle housing 38 and a handle 42 that is slidable within the handle housing 38 between a retracted position (FIG. 2) and an extended position. An actuator 46 (FIG. 3) locks the handle 42 in the retracted position to inhibit the handle 42 from unnecessarily being extended out of the handle housing 38. In the illustrated embodiment, the actuator 46 is a button. A user may operate (e.g., depress) the actuator 46 to release the handle 42, allowing the handle 42 to be moved from the retracted position to the extended position. The actuator 46 may then also secure the handle 42 in the extended position. Once the handle 42 is in the extended position, a user may tilt the drain cleaning device 10 onto the wheels 26 and transport the drain cleaning device 10 to a new location. To return the handle 42 to the retracted position, the user may again operate the actuator 46 to release the handle 42, allowing the handle 42 to be moved from the extended position to the retracted position.

Figure 4:
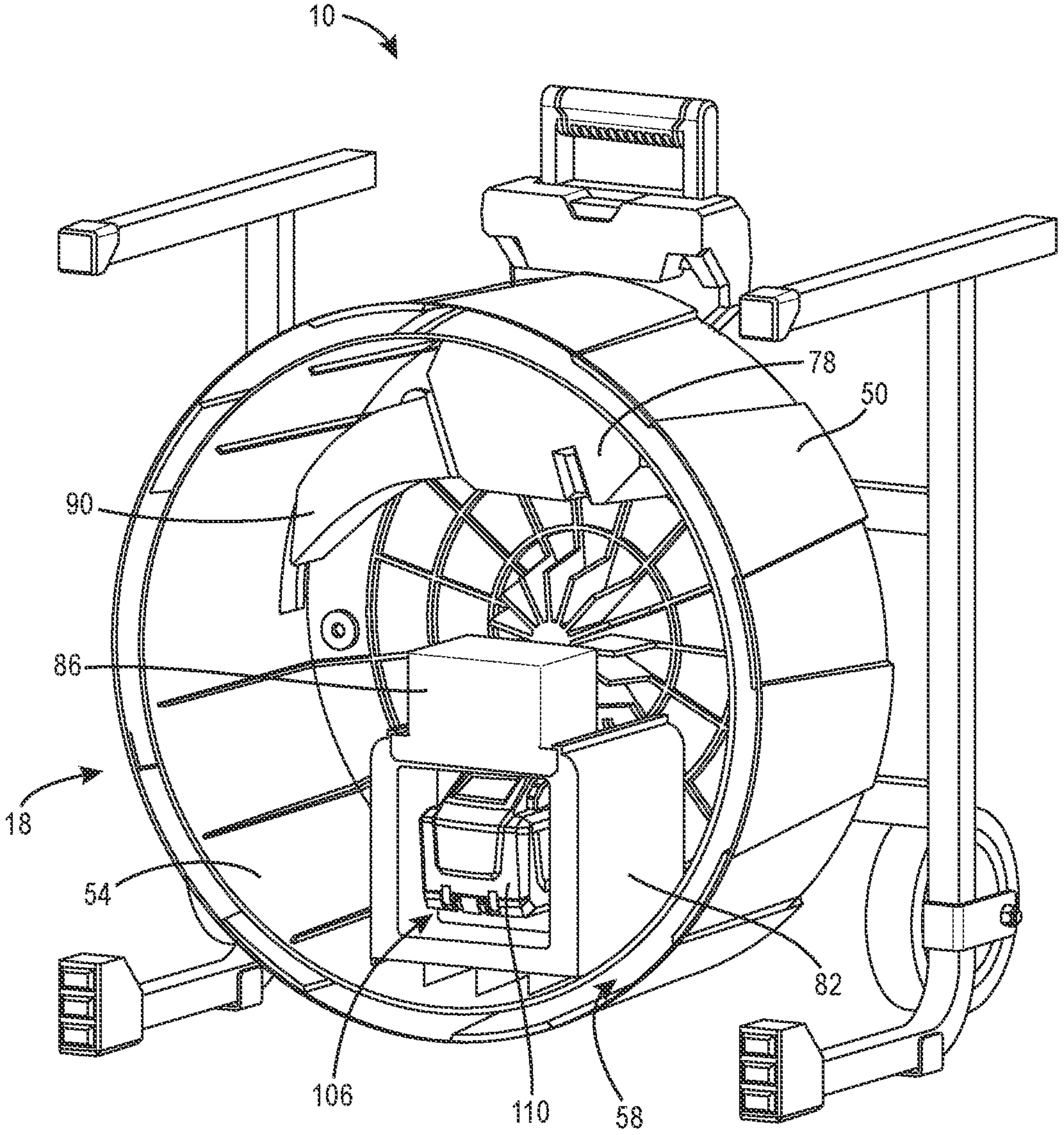
FIG. 4 is a front perspective view of the drain cleaning device of FIG. 1 with portions removed.
Figure 5:
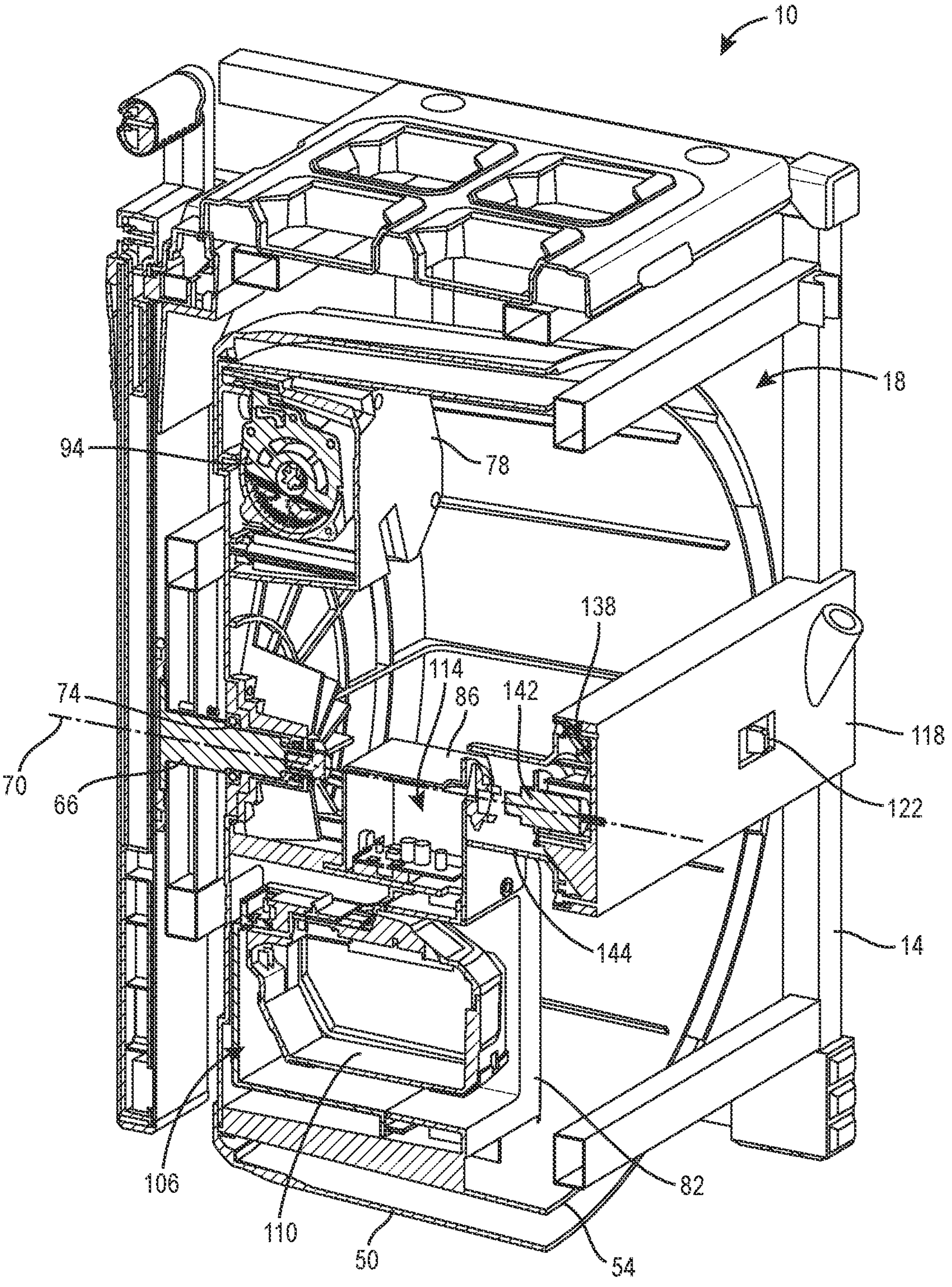
FIG. 5 is a cross-sectional view of the drain cleaning device of FIG. 1.

With reference to FIG. 4, the illustrated drum assembly 18 includes an outer drum 50 and an inner drum 54 coupled to the outer drum 50 for co-rotation therewith. In the illustrated embodiment, the outer and inner drums 50, 54 are cylindrical-shaped with an open front end and a closed rear end. In other embodiments, the inner and outer drums 50, 54 may be enclosed to define an interior. In further embodiments, the drum assembly 18 may further include a drum housing that surrounds the inner and outer drums 50, 54. The inner drum 54 has a smaller diameter than the outer drum 50 to define a space 58 therebetween. A drain cleaning cable 62 (FIG. 19) may be supported within the space 58, as described in more detail below:

As shown in FIG. 5, the drum assembly 18 is supported on the frame 14 by a support shaft 66. The support shaft 66 includes a first end that is coupled to the frame 14 and a second end that is coupled to the inner drum 54. The support shaft 66 defines an axis of rotation 70 of the drum assembly 18. A bearing 74 is positioned between the inner drum 54 and the support shaft 66 to allow rotation of the inner drum 54 relative to the support shaft 66. In the illustrated embodiment, the drum assembly 18 is idly supported on the support shaft 66. In other words, the drum assembly 18 is allowed to freely rotate on the support shaft 66. In other embodiments, the drum assembly 18 may be driven by a motor to rotate with or about the support shaft 66.

Figure 6:
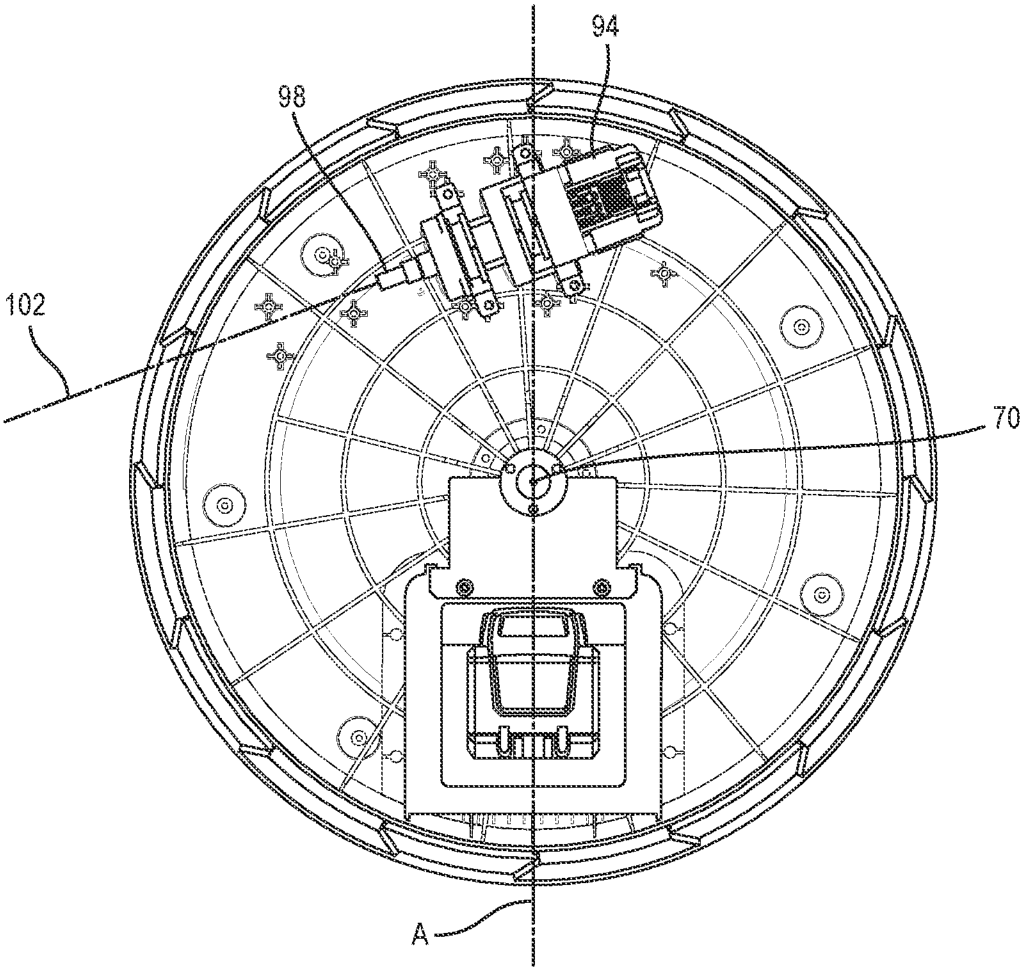
FIG. 6 is another front view of the drain cleaning device of FIG. 1 with portions removed.

Referring to FIGS. 4 and 5, the inner drum 54 supports a motor housing 78, a battery housing 82, an electronics housing 86, and a guide housing 90. A motor 94 is supported within the motor housing 78. In some embodiments, the motor 94 may be a DC brushless motor. In other embodiments, the motor 94 may include a brush. As shown in FIG. 6, the motor 94 includes an output shaft 98 that defines a motor axis 102. The output shaft 98 is configured to be directly coupled to the drain cleaning cable 62 to rotate the cable 62. The motor axis 102 is offset from the axis of rotation 70 of the drum assembly 18. More particularly, the motor axis 102 is spaced apart from, but perpendicular to the axis of rotation 70. The motor axis 102 is also orientated at an oblique angle relative to a vertical plane A (when the drain cleaning device 10 is in the upright position) extending through the axis of rotation 70. The vertical plane A extends through the support shaft 66 and the motor 94. The vertical plane A also extends through the battery housing 82. As will be described in more detail below, in other embodiments, the output shaft 98 may be oriented in other configurations.

With reference back to FIGS. 4 and 5, the battery housing 82 defines a battery receptacle 106 configured to receive a battery pack 110. In the illustrated embodiment, the battery receptacle 106 is positioned on a diametrically opposite side of the axis of rotation 70 form the motor 94. The battery pack 110 may include any of number of different nominal voltages (e.g., 12V, 18V, etc.), and may be configured having any of number of different chemistries (e.g., lithium-ion, nickel-cadmium, etc.). The battery pack 110 is operable to supply power to the motor 94 to energize the motor 94. The battery pack 110 is a removable battery pack. The battery pack 110 is also a rechargeable battery pack. Alternatively, the motor 94 may be powered by a remote power source (e.g., a household electrical outlet) through a power cord. In the illustrated embodiment, the battery pack 110 is inserted into the battery receptacle 106 in a direction that is parallel to the axis of rotation 70. As such, the battery pack 110 is mounted with its longitudinal axis parallel with the axis of rotation 70. In other embodiments, the battery pack 110 may be inserted into the battery receptacle 106 in a direction that is perpendicular or oblique to the axis of rotation 70. In further embodiments, the battery receptacle 106 may be positioned elsewhere on the drain cleaning device 10. For example, the battery receptacle 106 may be mounted on the frame 14. In such an embodiment, the battery pack 110 would not spin with the drum during a drain cleaning operation. Further, the battery receptacle 106 may be positioned adjacent the center of the inner drum 54. The battery housing 82 surrounds the battery pack 110 to inhibit fluids or other debris that may be expelled during operation of the drain cleaning device 10 from tampering with the battery pack 110.

Referring to FIG. 5, control electronics 114 are disposed within the electronics housing 86. The control electronics 114 may include a controller or processor that controls operation of the drain cleaning device 10. In some embodiments, the controller is implemented as a microprocessor with separate memory. In other embodiments, the controller may be implemented as a microcontroller (with memory on the same chip). In other embodiments, the controller may be implemented using multiple processors. In addition, the controller may be implemented partially or entirely as, for example, a field-programmable gate array (FPGA), an application specific integrated circuit (ASIC), and the like, and the memory may not be needed or be modified accordingly. The memory may include non-transitory, computer readable memory that stores instructions that are received and executed by the controller to carry out functionality of the drain cleaning device 10 described herein. The memory may include, for example, a program storage area and a data storage area. The program storage area may include combinations of different types of memory, such as read-only memory and random-access memory.

With reference back to FIG. 1, a control panel 118 is supported on the frame 14. The illustrated control panel 118 is positioned in front of the drum assembly 18. The control panel 118 includes a user interface 122. The user interface 122 may include, for example, a control switch or other suitable actuators. The user interface 122 may be selectively actuated to control operation of the drain cleaning device 10. For example, a user may toggle the user interface 122 to change the rotation direction of the output shaft 98 when the motor 94 is energized. Additionally, the user interface 122 may be a master power switch to turn the drain cleaning device 10 on and off. In other embodiments, the user interface 122 may control other operations of the drain cleaning device 10.

The illustrated control panel 118 also includes clip 126 to support a foot pedal 130. Although not shown, a power cord may be coupled at one end to the foot pedal 130 and at another end to an outlet 134 on the control panel 118. The foot pedal 130 is removable from the control panel 118 to allow a user to remotely control the device cleaning device 10 (e.g., near an opening through which the cable 62 is inserted). In the illustrated embodiment, the foot pedal 130 may be depressed to activate the motor 94. In some embodiments, the foot pedal 130 may include a switch to change the rotation direction of the motor 94, and thereby the cable 62. In other embodiments, the foot pedal 130 may include a variable speed mechanism to control the speed the motor 94 rotates the cable 62. For example, the motor 94 may vary the rotation speed of the cable 62 based on how far the foot pedal 130 is depressed. In some embodiments, the control electronics control the output speed of the motor and thus the speed the cable 62 rotates (i.e., variable speed control). In such an embodiment, the control panel 118 may include a variable speed control actuator to adjust the output speed of the motor and thus the cable 62. The variable speed control actuator may be a rotatable knob that may be set to a specific speed level (e.g., speed levels 1-10). In other embodiments, the variable speed control actuator may be positioned on the frame 14, the handle assembly 34, or another location on the drain cleaning device 10.

Referring to FIG. 5, in the illustrated embodiment, the control panel 118 defines an interior 138 that houses electrical components of the user interface 122 and the foot pedal 130. Specifically, the user interface 122 and the foot pedal 130 include electrical wires that are routed through the interior 138 of the control panel 118 to the electronics housing 86. A slip ring 142 is positioned between the control panel 118 and the electronics housing 86 to inhibit the electrical cables that extend between the control panel 118 and the electronics housing 86 from tangling during rotation of the drum assembly 18. A shroud 144 surrounds the slip ring 142 to protect debris and contaminants from interfering with the electrical cables passing through the slip ring 142. The shroud 144 rotates with the drum assembly 18 during operation of the drain cleaning device 10 while the slip ring 142 remains stationary. The slip ring 142 also helps support the front side of the drum assembly 18. In some embodiments, the battery receptacle 106 may be supported on the control panel 118. In such an embodiment, power may be transferred from the battery pack 110 to the motor 94 via electrical wires that pass through the slip ring 142. In further embodiments, the slip ring 142 may be positioned adjacent the support shaft 66 to allow electrical wires to pass through the back of the drum assembly 18 to the motor 94 or control electronics 114.

Figure 7:
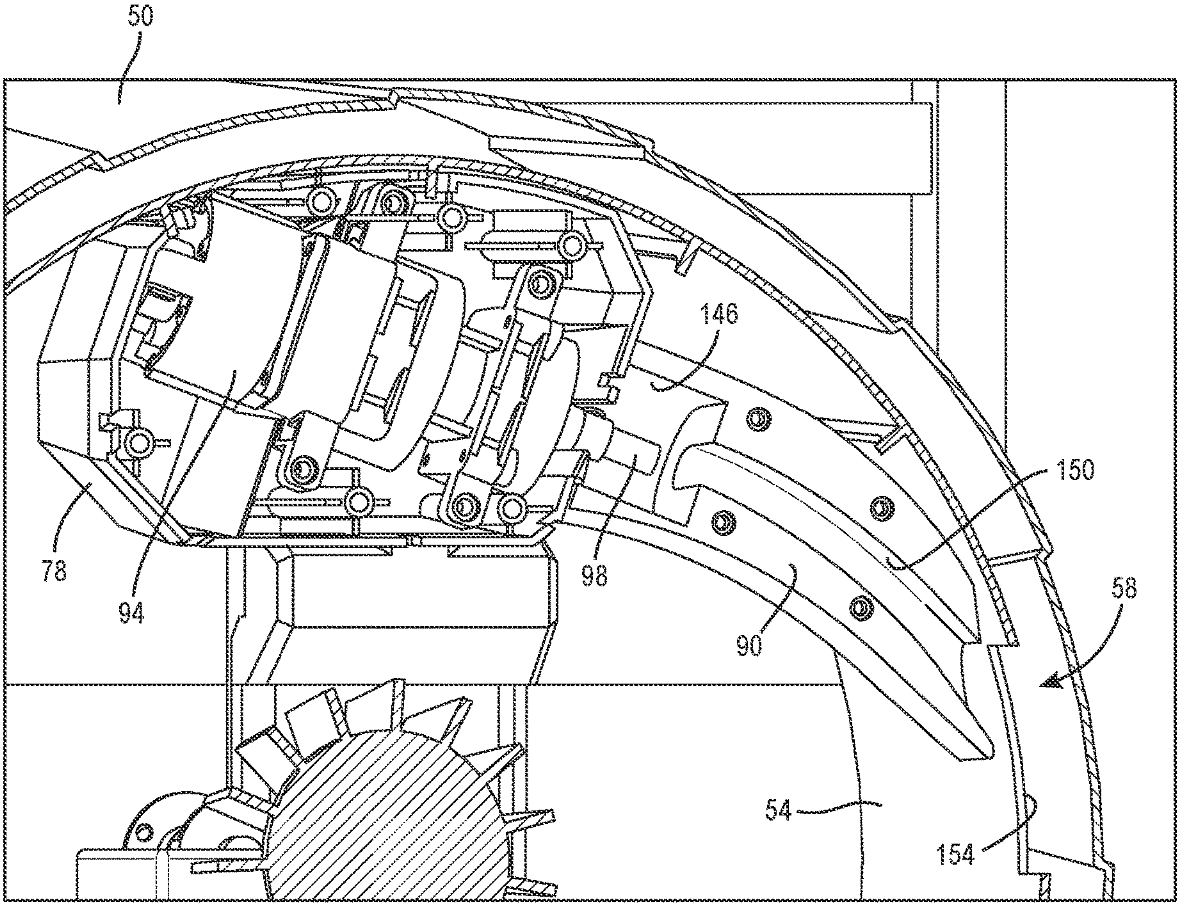
FIG. 7 is a rear perspective view of the drain cleaning device of FIG. 1 with portions removed.

With reference to FIG. 7, the guide housing 90 is coupled to the inner drum 54 adjacent the motor housing 78. The guide housing 90 defines a cavity 146 and a guide channel 150 extending from the cavity 146. The output shaft 98 of the motor 94 extends from the motor housing 78 into the cavity 146 in a direction that is aligned with the guide channel 150. The guide channel 150 terminates adjacent an opening 154 in the inner drum 54 that extends into the space 58 defined between the inner and outer drums 50, 54.

Figure 19:
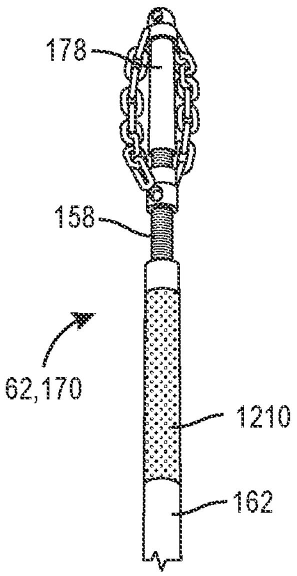
FIG. 19 is a perspective view of a portion of a cable for use with a drain cleaning device according to another embodiment.

In the illustrated embodiment, the drain cleaning cable 62 is also known as a flexible shaft cable. Compared to typical drain cleaning cables, the flexible shaft cable 62 includes a wound cable 158 that is encased by a sheath 162 (FIG. 19). The wound cable 158 is operable to be rotated by the motor 94 within the sheath 162. The flexible shaft cable 62 includes a first end 166 (FIG. 13) that is coupled to the motor 94 and a second end 170 (FIG. 19) that is operable to be extended into a drain to facilitate clearing the drain. Specifically, the wound cable 158 is directly coupled to the output shaft 98 of the motor 94 at the first end 166 of the cable 62 to rotate the wound cable 158 within the sheath 162. The portion of the cable 62 between the first and second ends 166, 170 extends from the output shaft 98 through the guide channel 150 and the opening 154 in the inner drum 54 to be coiled within the space 58 between the inner and outer drums 50, 54. The second end 170 of the cable 62 extends from the space 58 and through an outlet tube 174 (FIG. 1) disposed on the control panel 118. The outlet tube 174 assists a user in directing the cable 62 into a conduit. The outlet tube 174 may also support the second end 170 of the cable 62 when the drain cleaning device 10 is not in use. Specifically, a cable accessory 178 (FIG. 19) that is coupled to the second end 170 of the cable 62 may rest on top of the outlet tube 174. In some embodiments, the stiffness of the cable 62 depends on the size of the drum assembly 18. For example, for an outer drum 50) with a larger diameter, a cable having a higher stiffness will have less energy loss during operation of the drain cleaning device 10. As such, a ratio of the cable stiffness, in Newtons per millimeter (N/mm), to diameter of the drum, in inches (in.), is between 0.25 and 1.0. In some embodiments, the ratio of the cable stiffness to diameter of the drum is between 0.5 and 0.75. In further embodiments, the ratio of the cable stiffness to diameter of the drum may be more than 1.0 or less than 0.25.

In the illustrated embodiment, the output shaft 98 of the motor 94 directly drives the wound cable 158 to rotate within the sheath 162. In other embodiments, the drain cleaning device 10 may include a transmission to transfer rotation from the output shaft 98 to the cable 62. The transmission may include a gear system to transfer torque from the motor 94 to the cable 62. For example, the transmission may include a planetary gear system including a single stage or multiple stages, a planetary gearset with a bevel gear set, a planetary gearset with two bevel gearsets, only two bevel gearsets, a spur gearset, a helical gearset, a multi-speed gearbox, or a continuously variable gearbox.

Figure 15:
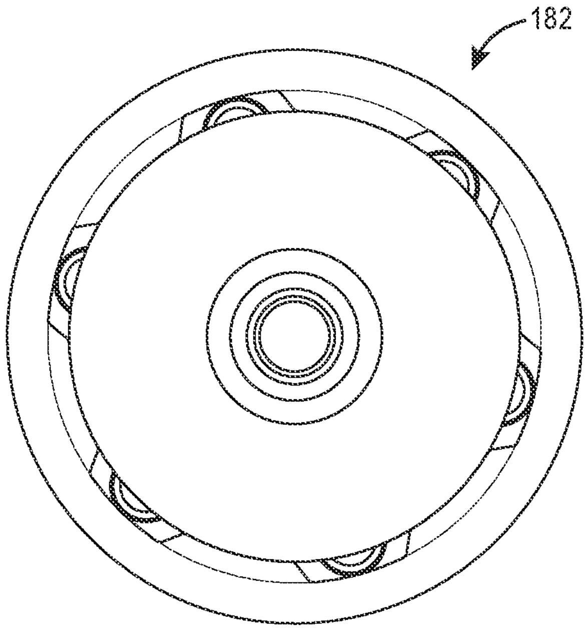
FIG. 15 is a cross-sectional view of a clutch for a drain cleaning device.

In some embodiments, the drain cleaning device 10 includes a clutch disposed between the output shaft 98 of the motor 94 and the first end 166 of the cable 62. The clutch is operable to allow slip between the output shaft 98 and the cable 62 if the output torque of the motor 94 exceeds a predetermined limit to protect the cable 62. For example, as shown in FIG. 15, the clutch could be a mechanical clutch 182, such as a radial roller clutch. Alternatively, the clutch may be a ball spring clutch, a friction plate, a friction cone, and electromechanical clutch, and the like. The mechanical clutch 182 may include a first setting for when the motor 94 rotates the output shaft 98 in a forward direction and a second setting for when the motor 94 rotates the output shaft 98 in a reverse direction. The first setting and the second setting may be different. For example, the second setting may allow the clutch to slip at a lower predetermined limit than the second setting.

In other embodiments, the clutch may be an electronic clutch that senses the output torque of the motor 94 by, for example, sensing the current supplied to the motor 94 from the battery pack 110. The electronic clutch may then allow slip to occur if the electronic clutch senses that the output torque from the motor 94 was above a predetermined limit. Alternatively, the electronic clutch may sense when the current is above the predetermined limit and communicate with the control electronics 114 to depower the drain cleaning device 10.

Figure 28:
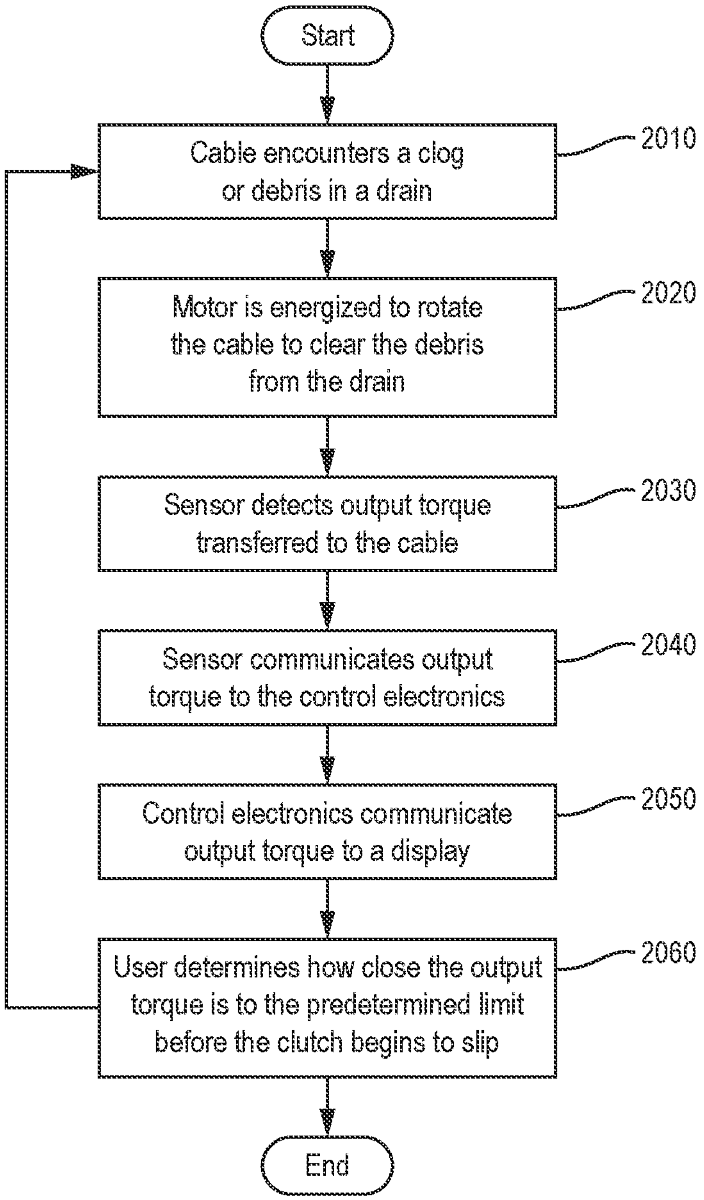
FIG. 28 illustrates a flowchart for an operation of the drain cleaning device of FIG. 1.

FIG. 28 illustrates a flowchart of operation for the drain cleaning device 10. In some embodiments, the drain cleaning device 10 may include a sensor, such as a torque sensor, that detects the output torque of the motor 94. For example, during operation of the drain cleaning device 10, in a first step 2010, a user may extend the cable 62 through a conduit until the cable 62 encounters a clog or other debris. Next, in a second step 2020, the user may activate the motor 94 to rotate the cable 62 to clear the clog or debris from the conduit. As the cable 62 is rotated, the sensor, in a third step 2030, detects the output torque transferred from the motor 94 to the cable 62. The sensor then, in a fourth step 2040, communicates the output torque to the control electronics 114. The control electronics 114 then communicate the output torque to a user display in a fifth step 2050. The output torque is indicative of the amount of resistance the cable 62 may be experiencing when encountering a clog in a drain. As such, in a sixth step 2060, a user can then determine how close the output torque is to the predetermined limit before the clutch begins to slip. The first through sixth steps 2010-2060 can then be repeated as necessary while the user continues to clear the conduit. Knowing how close the output torque is to the predetermined limit before the clutch begins to slip allows a user to more effectively remove the clog.

During operation of the drain cleaning device 10, a user may extend the second end 170 of the cable 62 into a drain or other conduit. As the cable 62 is payed out from the drum assembly 18, the drum assembly 18 rotates in a first direction. Once the second end 170 of the cable 62 encounters a clog, the user may depress the foot pedal 130 to activate the motor 94 and rotate the wound cable 158 within the sheath 162. Based on the user interface 122, the wound cable 158 will spin either clockwise or counterclockwise within the sheath 162. As the wound cable 158 rotates, the cable accessory 178 assists in removing the debris or clog. Alternatively, a user may force the second end 170 of the cable 62 past the debris within a drain first before activating the motor 94. Then, the user may depress the foot pedal 130 to activate the motor 94 while retracting the cable 62 out of the drain. The motor 94 rotates the wound cable 158 and thus the cable accessory 178 to remove the debris or clog. While the cable 62 is being retracted from the drain, the drum assembly 18 rotates in a second direction, opposite the first direction, to wind the cable 62 back within the space 58. In some embodiments, the drain cleaning device 10 may include a sensor that detects when the cable 62 is being retracted from a drain. The sensor then communicates with the control electronics 114 to automatically activate the motor 94 to rotate the wound cable 158. For example, the sensor may detect that the drum assembly 18 is spinning in the second direction and activate the motor 94. Alternatively, the sensor may be positioned on the cable 62 to detect rearward movement of the cable 62. Once the drain has been sufficiently removed of debris and clogs, the user can then retract the cable 62 from the drain to store the cable 62 within the drum assembly 18.

In some embodiments, the control electronics 114 may include a wireless communication device to communicate with an external device, such as a smart phone or tablet. The wireless communication device communicates with the control electronics 114 based on user input from the external device. For example, a user may use the external device to define operating parameters of the drain cleaning device 10 such as minimum and maximum torque or revolutions per minutes of the output shaft 98 of the motor 94.

Providing a drain cleaning device 10 with a motor 94 that directly drives a cable 62 allows the cable 62 to rotate at higher torque compared to drain cleaning devices that rely on driving a drum assembly to produce friction to rotate the cable. Rotating the cable 62 at higher torque more efficiently cleans a drain or other conduit.

Figure 8:
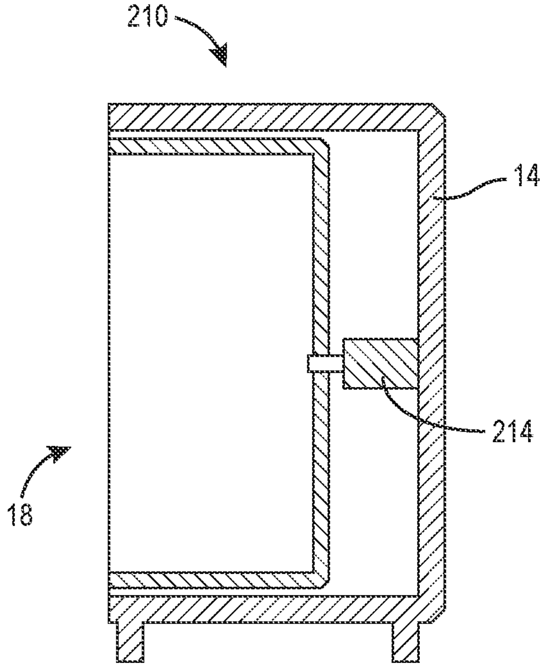
FIG. 8 is side cross-sectional view of a drain cleaning device according to another embodiment.

FIG. 8 illustrates a drain cleaning device 210 according to another embodiment of the invention. The drain cleaning device 210 is similar to the drain cleaning device 10 with like features being represented with like reference numbers. The drain cleaning device 10 includes a second motor 214 coupled to the drum assembly 18. The second motor 214 is operable to spin the drum assembly 18 during a drain cleaning operation. During operation of the drain cleaning device 210, a user may activate the motor 94 using the foot pedal 130 to rotate the cable 62 to facilitate clearing debris from the drain. Additionally, the second motor 214 rotates the drum assembly 18 to assist the user in feeding or retracting the cable 62 from the drum assembly 18. In some embodiments, the drain cleaning device 210 may include a separate actuator that activates the second motor 214 when a user is either retracting or feeding the cable 62. In other embodiments, the second motor 214 may be controlled by the user interface 122 or by the foot pedal 130. Further, the drain cleaning device 210 may include a control switch, similar to the user interface 122, to toggle the direction the second motor 214 rotates depending on whether the user wants to feed the cable 62 into a drain or retract the cable 62 from a drain.

Figure 9:
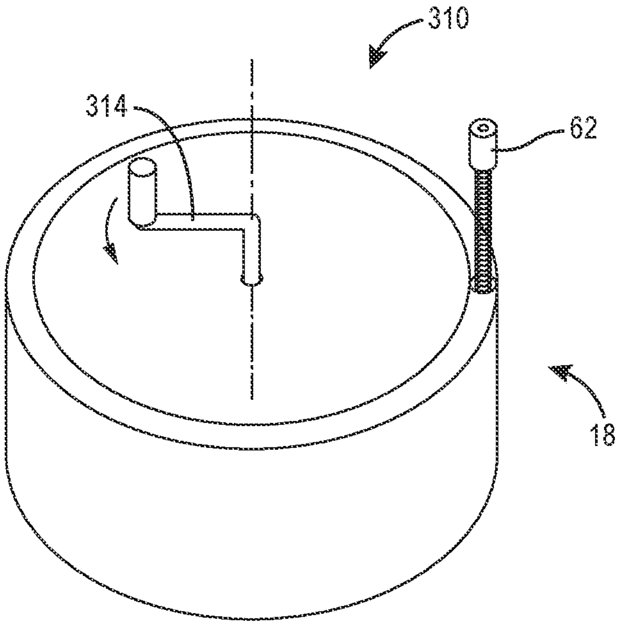
FIG. 9 is a perspective view of a drain cleaning device according to another embodiment.

FIG. 9 illustrates a drain cleaning device 310 according to another embodiment of the invention. The drain cleaning device 310 is similar to the drain cleaning device 10 with like features being represented with like reference numerals. The drain cleaning device 310 includes a handle 314 coupled to the drum assembly 18 to rotate the drum assembly 18. The illustrated, handle 314 is coupled to the front side of the drum assembly 18. In other embodiments, the handle 314 may be coupled to the rear side of the drum assembly 18. A user may use the handle 314 to assist in paying out the cable 62 from the drum assembly 18 or retracting the cable 62 into the drum assembly 18. The handle 314 allows users to quickly pay out or retract the cable 62 compared to just using their hands to rotate the drum assembly 18. In some embodiments, the handle 314 may be a collapsible handle that can fold or otherwise move into the drum assembly 18 when not in use.

Figure 10:
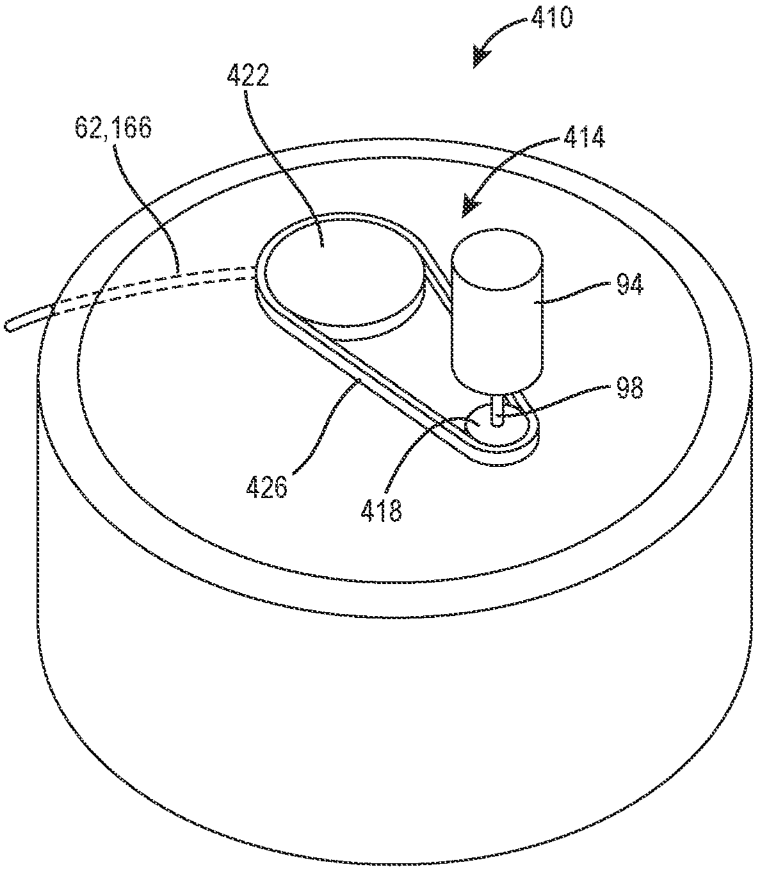
FIG. 10 is a front view of a drain cleaning device according to another embodiment.

FIG. 10 illustrates a drain cleaning device 410 according to another embodiment of the invention. The drain cleaning device 410 is similar to the drain cleaning device 10 with like features being represented with like reference numbers. The drain cleaning device 410 includes a belt drive 414 to rotate the cable 62. The belt drive 414 includes a first pulley 418 that is coupled to the output shaft 98 of the motor 94 to receive torque from the motor 94, a second pulley 422 that is coupled to the first end 166 of the cable 62, and a continuous belt 426 disposed about the first and second pulleys 418, 422. The motor 94 rotates the first pulley 418 which drives the belt 426 to rotate the second pulley 422 which rotates the wound cable 158.

Figure 11:
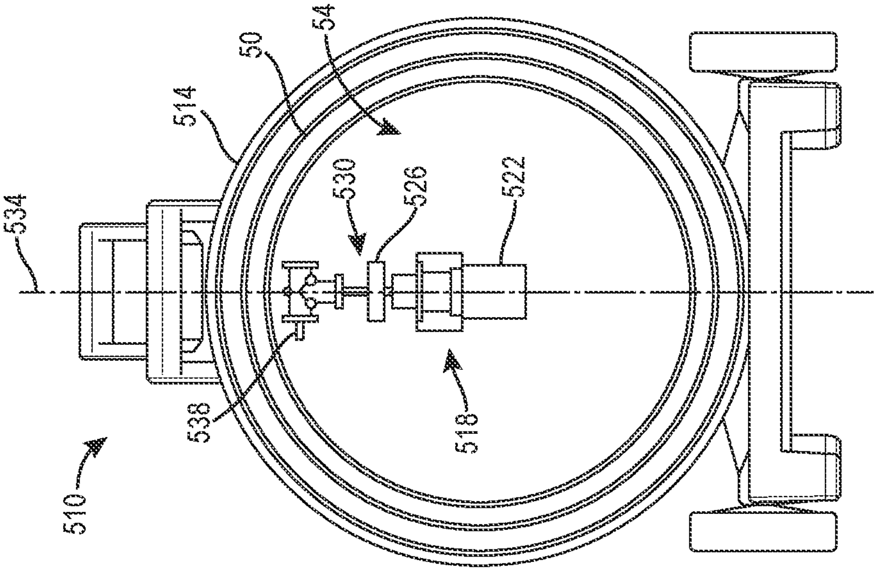
FIG. 11 is a front view of a drain cleaning device according to another embodiment.

FIG. 11 illustrates a drain cleaning device 510 according to another embodiment of the invention. The drain cleaning device 510 is similar to the drain cleaning device 10 with like features being represented with like reference numbers. The drain cleaning device 510 includes the inner drum 54, the outer drum 50, and a drum housing 514 surrounding the inner and outer drums 50, 54. A drivetrain 518 is supported within the inner drum 54. The drivetrain 518 includes a motor 522 with an output shaft 526 and a transmission 530 coupled to the output shaft 526 to transfer torque from the motor 522 to the cable 62. In the illustrated embodiment, a rotation axis 534 of the motor 522 intersects and is perpendicular to the axis of rotation 70. The transmission 530 includes a bevel gear set that transfers rotation to an intermediate shaft 538 that is perpendicular to the rotation axis 534 of the motor 522 and the axis of rotation 70. The intermediate shaft 538 is coupled to the first end 166 of the cable 62 to transfer torque from the motor 522 to the wound cable 158.

Figure 12:
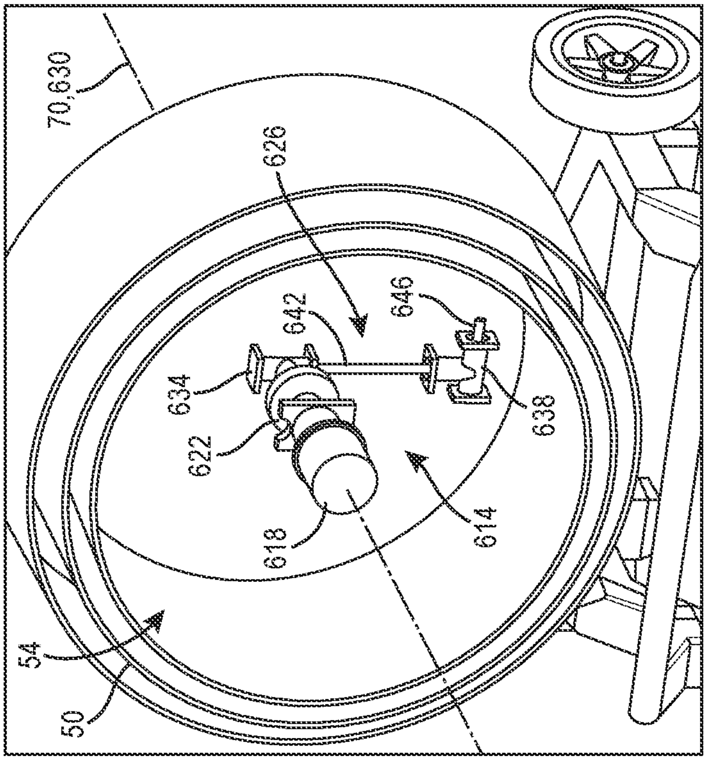
FIG. 12 is a perspective view of a drain cleaning device according to another embodiment.

FIG. 12 illustrates a drain cleaning device 610 according to another embodiment of the invention. The drain cleaning device 610 is similar to the drain cleaning device 10) with like features being represented with like reference numbers. The drain cleaning device 610 includes a drivetrain 614 supported within the inner drum 54. The drivetrain 614 includes a motor 618 with an output shaft 622 and a transmission 626. In the illustrated embodiment, a rotation axis 630 of the motor 618 is coaxial and parallel to the axis of rotation 70. In other embodiments, the rotation axis 630 of the motor 618 may be parallel to and offset from the axis of rotation 70. The transmission 626 includes first and second bevel gearsets 634, 638. The first bevel gearset 634 is coupled to the output shaft 622 of the motor 618 to receive torque from the motor 618. The first bevel gearset 634 is coupled to the second bevel gearset 638 through a first intermediate shaft 642 that intersects and is perpendicular to the rotation axis 630 of the motor 618. The second bevel gearset 638 includes a second intermediate shaft 646 that is perpendicular to the first intermediate shaft 642. The second intermediate shaft 646 is coupled to the first end 166 of the cable 62 to transfer torque from the motor 618 to the wound cable 158.

Figure 13:
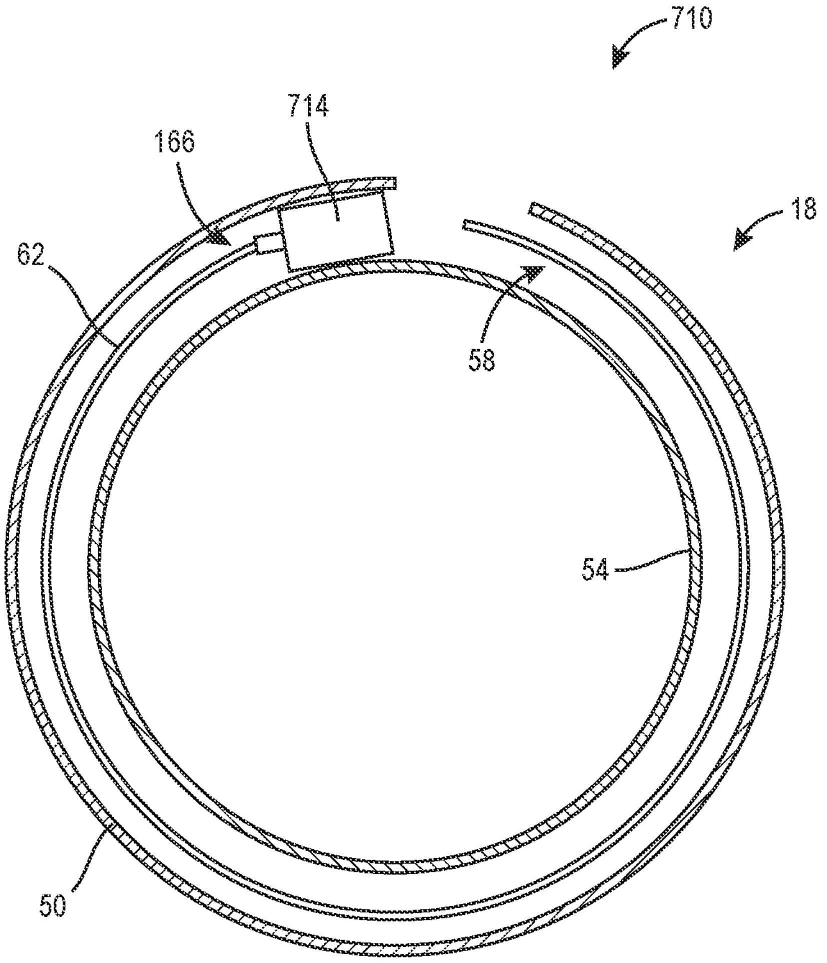
FIG. 13 is a front view of a drain cleaning device according to another embodiment.

FIG. 13 illustrates a drain cleaning device 710 according to another embodiment of the invention. The drain cleaning device 710 is similar to the drain cleaning device 10 with like features being represented with like reference numbers. The drain cleaning device 710 includes a motor 714 that is positioned within the space 58 between the inner and outer drums 50, 54. Having the motor 714 positioned within the space 58 negates needing the cable 62 to bend between the motor 714 and the space 58 which lowers torque losses between the motor 714 and the cable 62.

Figure 14:
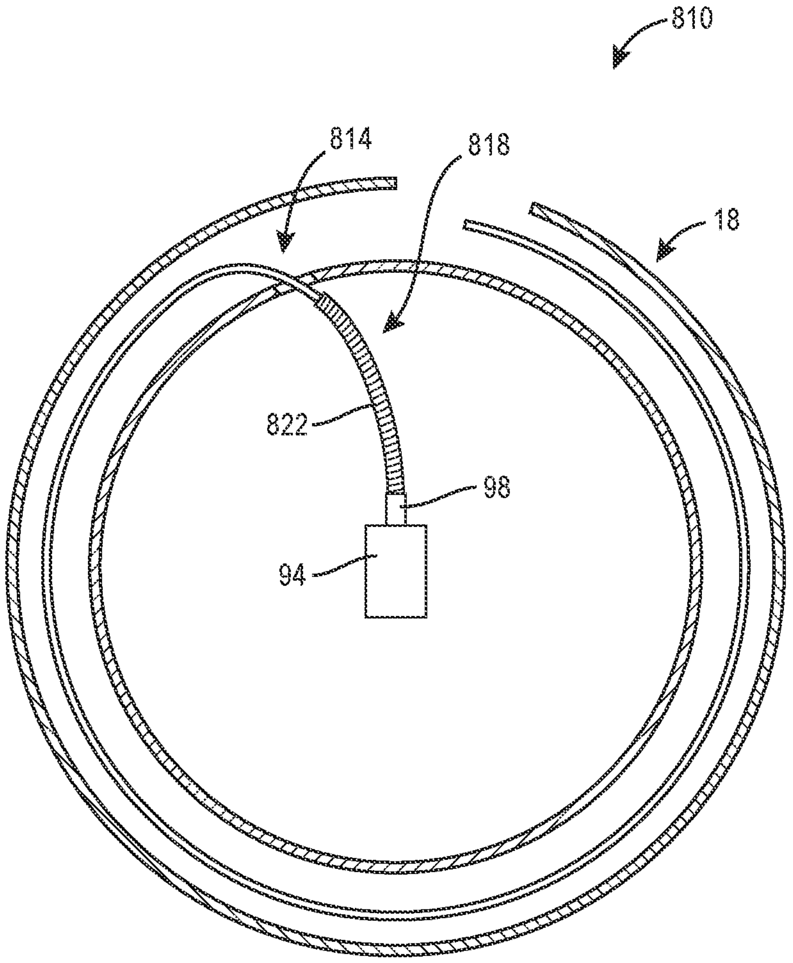
FIG. 14 is a front view of drain cleaning device according to another embodiment.

FIG. 14 illustrates a drain cleaning device 810 according to another embodiment of the invention. The drain cleaning device 810 is similar to the drain cleaning device 10 with like features being represented with like reference numbers. The drain cleaning device 810 includes a drain cleaning cable 814 with a first end 818 and a second end (not shown) opposite the first end 818. The first end 818 of the cable 814 includes a flexible portion 822 that connects to the output shaft 98 of the motor 94. The flexible portion 822 is more resilient than the rest of the cable 814 resulting in lower torque losses between the motor 94 and the cable 814. In some embodiments, the flexible portion 822 may be a separate piece that is coupled to the remainder of the drain cleaning cable 814.

Figure 16:
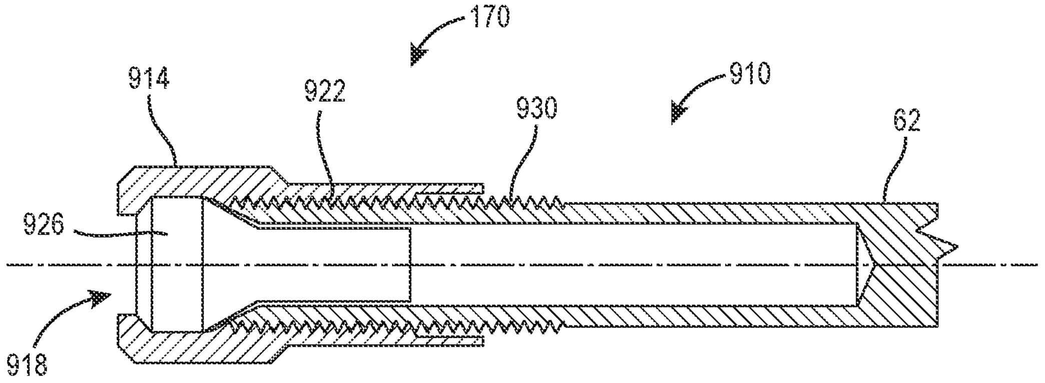
FIG. 16 is a cross-sectional view of a portion of a cable for use with a drain cleaning device.

FIG. 16 illustrates an attachment device 910 to couple a cable accessory 178 to the second end 170 of the cable 62. The attachment device 910 includes a nut 914 having a bore 918 with internal threads 922 and a collet 926 received within the bore 918. The internal threads 922 are threaded onto external threads 930 on the second end 170 of the cable 62. A cable accessory 178 may then be secured to the collet 926 to rotate with the drain cleaning cable 62. In other embodiments, a cable accessory 178 (FIG. 17) may be coupled to the second end 170 of the cable 62 using a band clamp. A band clamp may also be used to secure the first end 166 of the cable 62 to the output shaft 98 of the motor 94 or the transmission.

Figure 17:
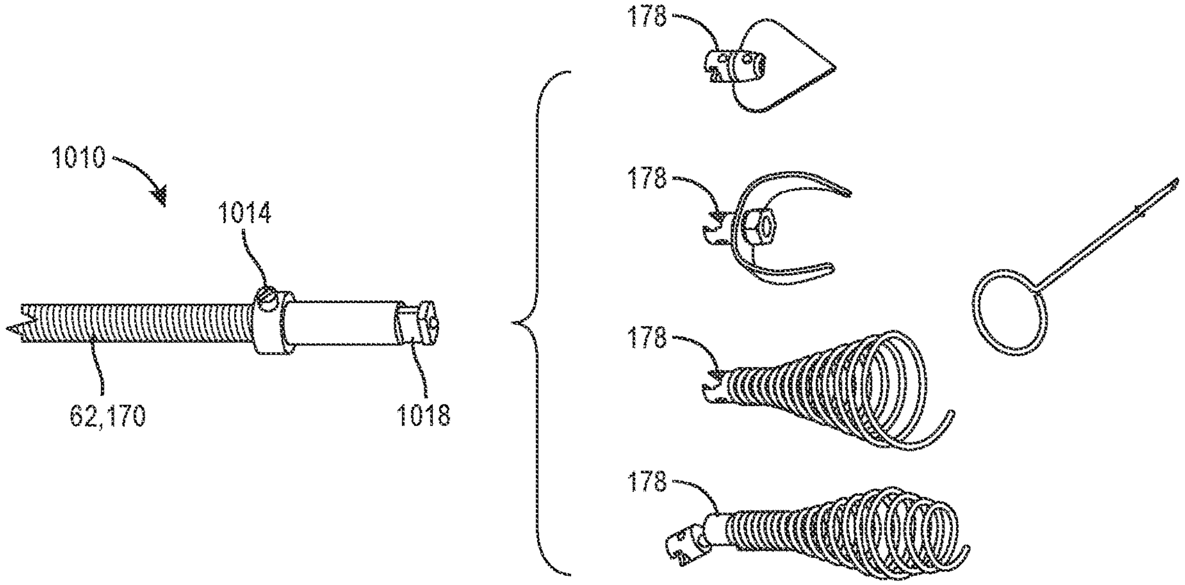
FIG. 17 is a perspective view of a portion of a cable for use with a drain cleaning device according to another embodiment.

FIG. 17 illustrates an attachment device 1010 to couple a cable accessory 178 to the second end 170 of the cable 62. The attachment device 1010 is coupled to the cable 62 using a set screw 1014. The attachment device 1010 includes a t-shaped protrusion 1018 that corresponds to a t-shaped slot on the cable accessory 178. The t-shaped connection between the attachment device 1010 and the cable accessory 178 allows for quick and easy attachment of different accessories to the cable 62.

Figure 18:
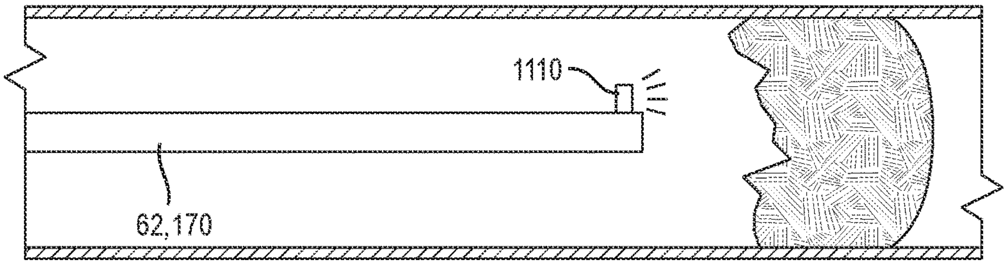
FIG. 18 is a plan view of a cable for use with a drain cleaning device according to another embodiment.

In some embodiments, the cable 62 includes an optical sensor 1110 (FIG. 18) adjacent the second end 170 of the cable 62 to detect if a clog is near. The optical sensor 1110 may be a photoconductive sensor, a photovoltaic sensor, or a photodiode. The optical sensor 1110 may detect the amount of ambient light within a drain to determine if a clog is in front of the cable 62. Alternatively, the optical sensor 1110 may include a light emitting diode (LED) that shines a light in front of the cable 62 then, based on the amount of light reflected back, the sensor 1110 determines if a clog is present. The optical sensor 1110 may also sense if the cable 62 is in line with the clog. Once the optical sensor 1110 detects that the cable 62 is in position to clear the clog, the optical sensor 1110 communicates to the control electronics 114 to energize the motor 94 to rotate the cable 62 to facilitate clearing the clog. Once the clog has been removed and the sensor 1110 no longer detects a clog, the sensor 1110 communicates to the control electronics 114 to power off the motor 94.

Figure 20:
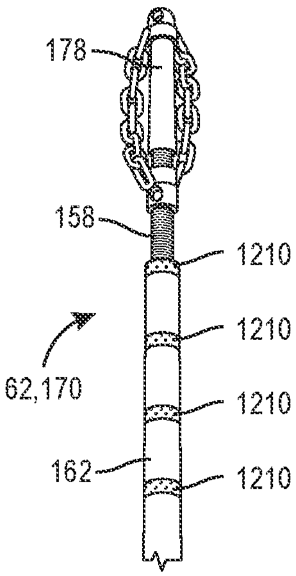
FIG. 20 is a perspective view of a portion of a cable for use with a drain cleaning device according to another embodiment.

In some embodiments, the sheath 162 of the cable 62 may include indicia or markings that indicate to a user how much of the cable 62 has been payed into a drain or other conduit. For example, as shown in FIG. 19, the sheath 162 may include a solid marking 1210 of a predetermined length adjacent the second end 170 of the cable 62 to alert the user that the cable accessory 178 is almost removed from the drain. In the illustrated embodiment, the solid marking 1210 includes a length of 8 inches. In other embodiments, the solid marking 1210 includes a length that is greater than or less than 8 inches. Alternatively, as shown in FIG. 20, the sheath 162 may include multiple markings 1210 spaced in equal intervals along the length of the cable 62 to alert a user of how much of the cable 62 has been payed into the drain.

Figure 21:
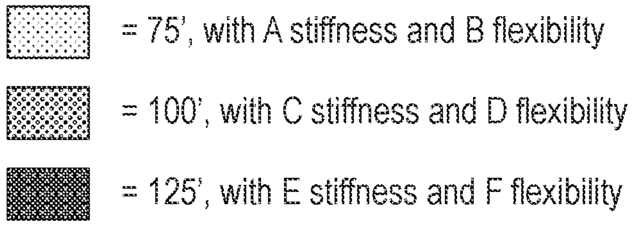
FIG. 21 is a key for a cable for use with a drain cleaning device.

In some embodiments, the sheath 162 of the cable 62 may include a specific color that indicates to the user characteristics of the cable 62 (e.g., flexibility, length, stiffness). For example, as shown in FIG. 21, a red sheath may indicate the cable 62 is 75 feet long with a first stiffness and a first flexibility. A green sheath may indicate that the cable 62 is 100 feet long with a second stiffness and a second flexibility. A blue sheath may indicate that the cable 62 is 125 feet long with a third stiffness and a third flexibility.

Figure 22:
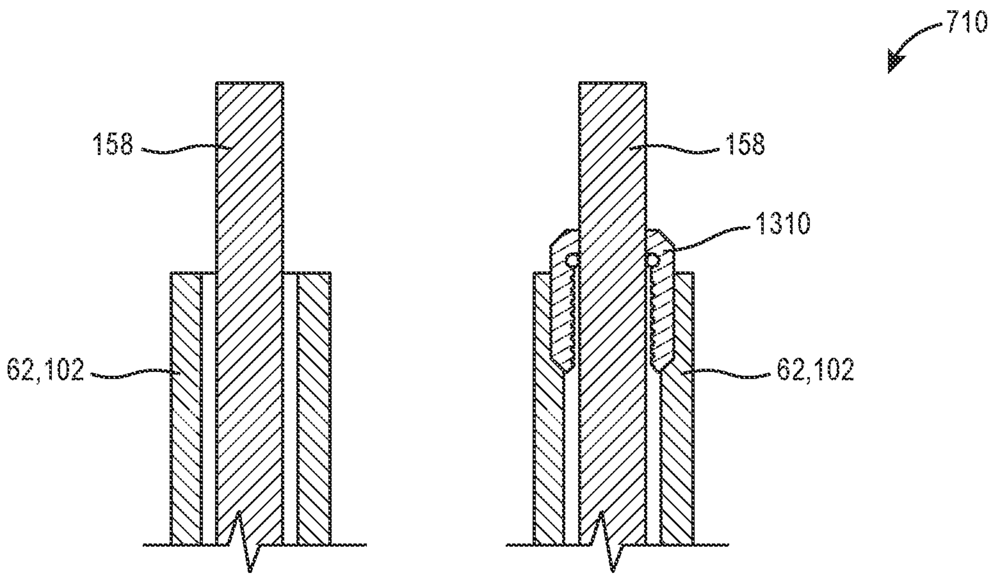
FIG. 22 is a perspective view of a portion of a cable for use with a drain cleaning device according to another embodiment.
Figure 23:
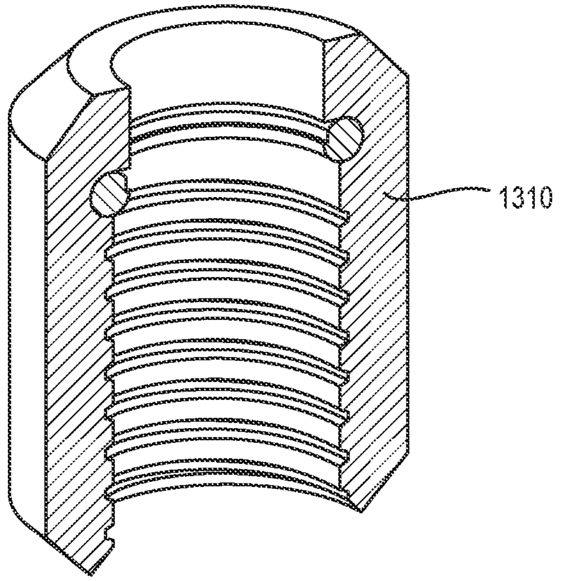
FIG. 23 is a cross-sectional, perspective view of a seal for use with the cable of FIG. 22.

In some embodiments, as shown in FIG. 22, the drain cleaning cable 62 may include a seal member 1310 (FIG. 23) attached to the ends 166, 170 of the cable 62 to inhibit liquids and other contaminants from entering the space 58 between the wound cable 158 and the sheath 162. The seal member 1310 may include an attachment that couples to either end 166, 170 of the cable 62. For example, the attachment may include inner threads that thread onto the outer sheath 162 of the cable 62. A ring, such as an O-ring or an X-ring, may be positioned within the attachment to engage and form a seal with the wound cable 158.

Figure 24:
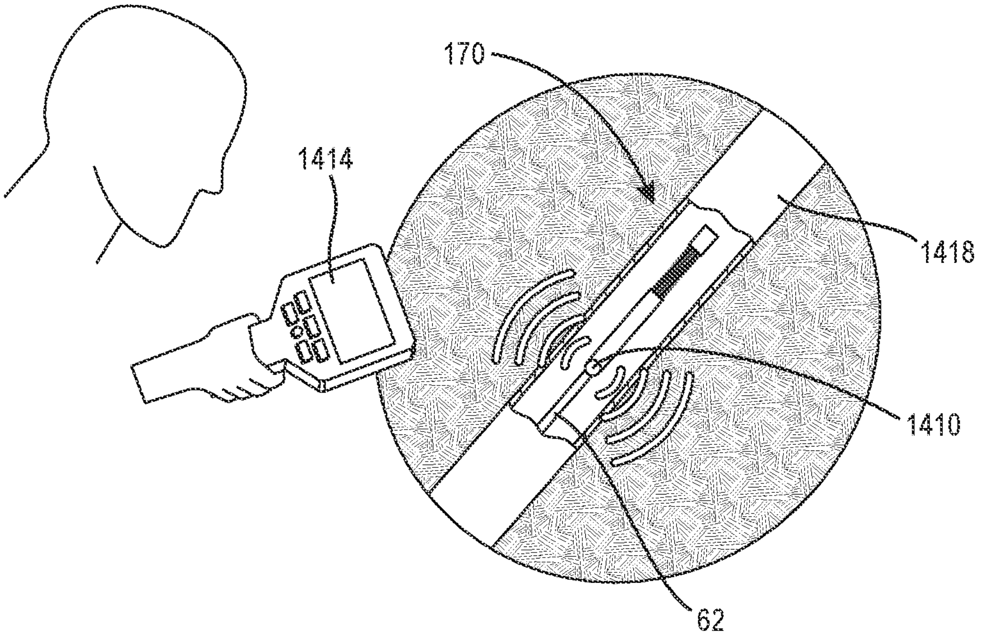
FIG. 24 is a perspective view of a cable for use with a drain cleaning device according to another embodiment.

In some embodiments, as shown in FIG. 24, the cable 62 may include a ground wire 1410 or other conductor adjacent the second end 170 of the cable 62. The ground wire 1410 may be detectable with a locator (e.g., sonde locator 1414) that detects the location of the cable 62 based on an output from the ground wire 1410. A user could use the locator 1414 to detect the ground wire 1410 and determine the position of the second end 170 of the cable 62 within a drain or conduit when the drain or conduit is underground.

Figure 25:
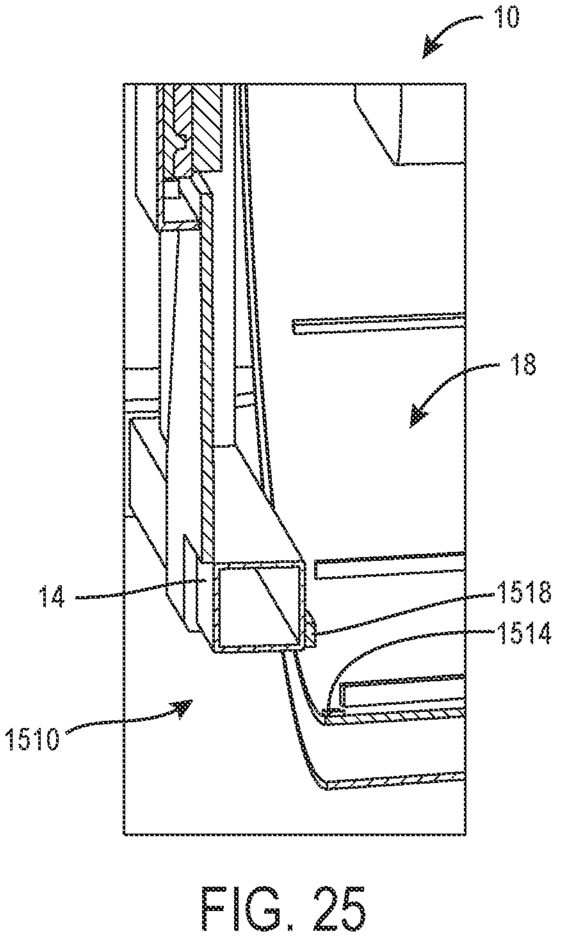
FIG. 25 is a perspective view of a cable feed detection mechanism for use with a drain cleaning device.

In some embodiments, the drain cleaning device 10 may include a cable feed detection mechanism 1510 that detects how much of the cable 62 has been paid out of the drain cleaning device 10. For example, as shown in FIG. 25, the cable feed detection mechanism 1510 may include a magnet 1514 coupled to the drum assembly 18 and a Hall effect sensor 1518 coupled to the frame 14 to detect the magnet 1514. As the drum assembly 18 rotates due to the cable 62 being fed out of the drum assembly 18, the Hall effect sensor 1518 detects the position of the magnet 1514 as it passes. The Hall effect sensor 1518 then communicates with the control electronics 114 to determine how much of the cable 62 has been payed out of the drum assembly 18. The control electronics 114 then output the amount of the cable 62 payed out of the drum assembly 18 to a display. In some embodiments, the display may be positioned on the foot pedal 130. In other embodiments, the control electronics 114 may wirelessly communicate the amount of the cable 62 payed out to an external device. In further embodiments, the display may flash to alert a user that the remaining slack of the cable 62 is almost depleted. The cable feed detection mechanism 1510 may also include a button to zero out the amount of the cable 62 payed out of the drum assembly 18.

Alternatively, the cable feed detection mechanism 1510 may include a limit switch coupled to the drum assembly 18 or the frame 14 to detect how much of the cable 62 has been paid out of the drain cleaning device 10. The limit switch may be activated after a predetermined angular rotation of the drum assembly 18. For example, a corresponding magnet or a protrusion may be coupled to the frame 14 or drum assembly 18 and during rotation of the drum assembly 18 the magnet or protrusion engages the limit switch to activate the limit switch. The control electronics 114 may monitor the limit switch to calculate how much of the cable 62 has been payed out of the drum assembly 18 based on the number of times the magnet or protrusion activates the limit switch.

Further, the cable feed detection mechanism 1510 may include a plurality of radio frequency identification (RFID) tags positioned in equal intervals along the length of the cable 62. The RFID tags each include a specific identification number that corresponds to a length of the cable 62. A RFID reader senses that RFID tags as the cable 62 is payed out of the drum assembly 18 and communicates the identification number to the control electronics 114. The control electronics 114 may then communicate the length of cable associated with each RFID tag to a display.

Figure 26:
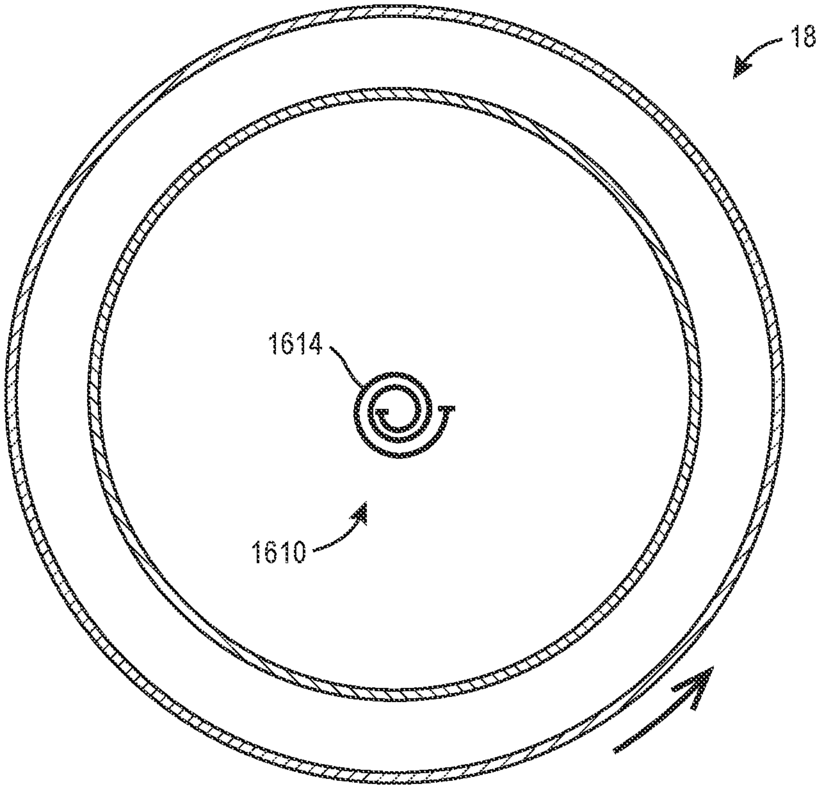
FIG. 26 is a plan view of a drain cleaning device according to another embodiment.

FIG. 26 illustrates a cable feed detection mechanism 1610 according to another embodiment of the invention. The cable feed detection mechanism 1610 includes a torsion spring 1614 that resists rotation of the drum assembly 18. A sensor measures the force from the spring 1614 and communicates it to the control electronics 114. The control electronics 114 then output the amount of the cable 62 payed out of the drum assembly 18 to a display. In other embodiments, the drain cleaning device 10 may include a counter that rotates with the drum assembly 18 and is calibrated to determine the amount of the cable 62 payed out based on the number of revolutions of the drum assembly 18.

Figure 27:
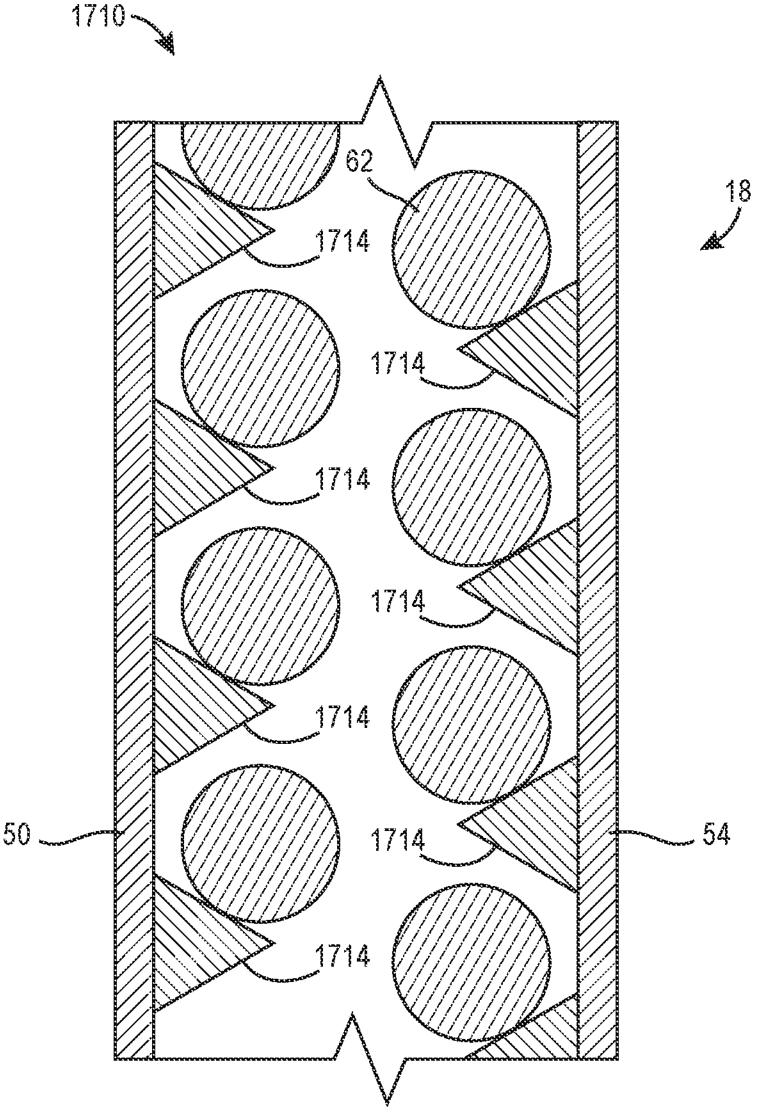
FIG. 27 is a cross-sectional view of a portion of a drain cleaning device according to another embodiment.

FIG. 27 illustrates a portion of a drain cleaning device 1710 according to another embodiment of the invention. The drain cleaning device 1710 is similar to the drain cleaning device 10 with like features being represented with like reference numbers. The drain cleaning device 1710 includes a plurality of projections 1714 between the walls of the inner and outer drums 50, 54. The projections 1714 help align the cable 62 within the space 58 between the inner and outer drums 50, 54 of the drum assembly 18. For example, the projections 1714 help locate the cable 62 in a double row of partially overlapping coils. As such, the projections 1714 inhibit the cable 62 from tangling within the drum assembly 18. In the illustrated embodiment, the projections 1714 are teeth that are offset or staggered on opposing sides of the space 58 of the drum assembly 18. The teeth are generally triangle-shaped. In other embodiments, other suitable projections having other shapes may be used.

Figure 29:
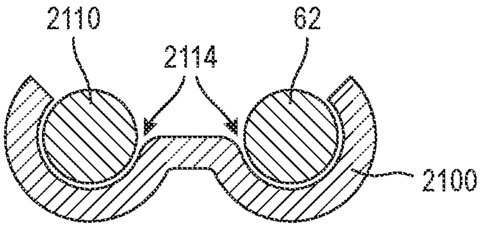
FIG. 29 is a cross-sectional view of a cable clip for use with the drain cleaning device of FIG. 1.
Figure 30:
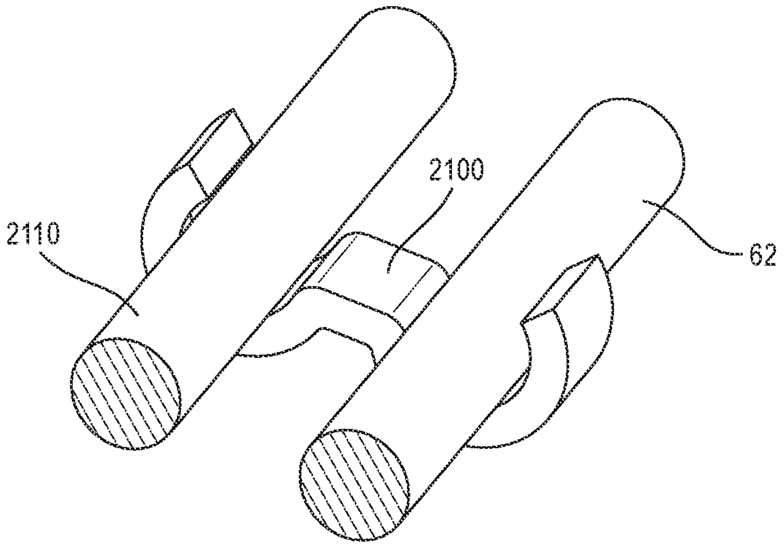
FIG. 30 is a perspective view of the cable clip of FIG. 29.

FIGS. 29 and 30 illustrate a cable clip 2100 for use with the drain cleaning device 10. In some embodiments, the drain cleaning device 10 may be used in conjunction with a dedicated drain camera device. The drain camera device includes a camera cable 2110 with a camera positioned at one end of the camera cable 2110. The camera may be extended into a drain or conduit to provide images of the pipe or a clog within the pipe. During operation, the cable clip 2100 may conjoin the drain cleaning cable 62 with the camera cable 2110 to move the cables 62, 2110 together through a drain. A user can then receive images of a clog within the drain and use the cable 62 to effectively remove the clog based on the images. The cable clip 2100 includes two recesses 2114 to support either the cable 62 or the camera cable 2110. In some embodiments, the cable clip 2100 may include a locking mechanism to secure the cables 62, 2110 within the recesses 2114.

Although the invention has been described with reference to certain embodiments, variations and modifications exist within the scope and spirit of the invention. Various features and advantages are set forth in the following claims.

What is claimed is:

1. A drain cleaning device comprising:

a frame;

a drum assembly supported by the frame, the drum assembly including an inner drum, an outer drum, and a space defined therebetween, the drum assembly configured to rotate about an axis of rotation;

a motor supported by the drum assembly, the motor including an output shaft;

a flexible cable stored within the space, the flexible cable defining a first end and a second end opposite the first end, the first end coupled to the output shaft to receive torque from the motor; and a battery receptacle supported by the drum assembly, the battery receptacle configured to receive a battery pack that supplies power to the motor; and a control panel supported by the frame to control operation of the drain cleaning device;

wherein the second end of the flexible cable extends through an outlet on the control panel.

2. The drain cleaning device of claim 1, wherein the battery receptacle is positioned within the inner drum.

3. The drain cleaning device of claim 1, wherein the battery receptacle is configured to receive the battery pack in a direction that is parallel to the axis of rotation.

4. The drain cleaning device of claim 1, wherein the motor is a first motor, and the drain cleaning device further comprises a second motor to rotate the drum assembly about the axis of rotation.

5. The drain cleaning device of claim 1, wherein the control panel supports a foot pedal operable to remotely activate the motor.

6. The drain cleaning device of claim 1, wherein the output shaft defines a motor axis that is oblique to a plane defined by the axis of rotation.

7. The drain cleaning device of claim 1, wherein the drum assembly is supported on the frame by a support shaft.

8. The drain cleaning device of claim 7, wherein the drum assembly is operable to freely rotate on the support shaft.

9. The drain cleaning device of claim 1, wherein a vertical plane defined by the axis of rotation extends through the battery receptacle.

10. The drain cleaning device of claim 1, further comprising wheels and a handle assembly coupled to the frame to facilitate transporting the drain cleaning device across a surface.

11. The drain cleaning device of claim 1, further comprising a guide housing that guides the flexible cable from the motor to the space.

12. The drain cleaning device of claim 1, further comprising a modular storage bin supported by the frame.

13. The drain cleaning device of claim 1, further comprising a handle coupled to and operable to rotate the drum assembly.

14. The drain cleaning device of claim 1, wherein the first end of the flexible cable is coupled to the motor through a transmission.

15. The drain cleaning device of claim 1, wherein the motor is positioned within the space of the drum assembly.

16. The drain cleaning device of claim 1, wherein the flexible cable includes a flexible portion adjacent the first end that is more resilient than the rest of the flexible cable.

17. The drain cleaning device of claim 1, wherein the second end of the flexible cable includes an optical sensor configured to detect clogs in a drain.

18. The drain cleaning device of claim 1, wherein the flexible cable includes indicia corresponding to the amount of cable payed out from the drum assembly.

19. The drain cleaning device of claim 1, wherein the flexible cable includes a wound cable and a sheath disposed around the wound cable, and wherein the wound cable is rotatable relative to the sheath.

20. The drain cleaning device of claim 19, wherein the flexible cable further includes a seal member between the wound cable and the sheath positioned at either the first end or the second end.

21. The drain cleaning device of claim 1, wherein the flexible cable includes a ground wire that is detectable with an external device.

22. The drain cleaning device of claim 1, wherein the drum assembly includes a plurality of projections extending into the space configured to align the flexible cable.

23. The drain cleaning device of claim 22, wherein the plurality of projections includes offset teeth on opposing sides of the space.

24. The drain cleaning device of claim 1, wherein the drum assembly includes a closed rear end and an open front end opposite the rear end.

25. The drain cleaning device of claim 1, further comprising a control housing supported by the drum assembly;

control electronics disposed within the control housing; and a slip ring disposed between the control panel and the control housing to guide electrical wires from the control panel to the control housing.

26. A drain cleaning device comprising:

a frame;

a drum assembly including an inner drum, an outer drum, and a space defined therebetween, the drum assembly configured to rotate about an axis of rotation;

a motor supported by the drum assembly, the motor including an output shaft;

a control panel supported by the frame, the control panel configured to control operations of the drain cleaning device;

an electronics housing supported by the drum assembly for rotation with the drum assembly relative to the frame;

control electronics disposed within the electronics housing;

a slip ring disposed between the control panel and the electronics housing to guide electrical wires from the control panel to the electronics housing; and a flexible cable stored within the space, the flexible cable receiving torque from the motor to rotate.

27. The drain cleaning device of claim 26, further comprising a shroud surrounding the slip ring.

28. The drain cleaning device of claim 26, further comprising a battery receptacle supported by the drum assembly configured to receive a battery pack to supply power to the motor.

29. The drain cleaning device of claim 26, wherein the drum assembly is supported on the frame with the slip ring.

30. The drain cleaning device of claim 29, wherein the slip ring supports a front end of the drum assembly on the frame and a support shaft supports a rear end of the drum assembly on the frame.

* * * * *